(12) United States Patent
Kim et al.

(10) Patent No.: US 8,275,126 B2
(45) Date of Patent: Sep. 25, 2012

(54) APPARATUS AND METHOD FOR HASH CRYPTOGRAPHY

(75) Inventors: Moo Seop Kim, Daejeon (KR); Young Soo Park, Daejeon (KR); Ji Man Park, Daejeon (KR); Young Sae Kim, Daejeon (KR); Hong Il Ju, Daejeon (KR); Sung Ik Jun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 561 days.

(21) Appl. No.: 12/567,006

(22) Filed: Sep. 25, 2009

(65) Prior Publication Data

US 2010/0146296 A1    Jun. 10, 2010

(30) Foreign Application Priority Data

Dec. 8, 2008 (KR) .................. 10-2008-0124199

(51) Int. Cl.
  *H04L 9/06* (2006.01)
  *H04L 9/28* (2006.01)
  *H04K 1/00* (2006.01)
  *G06F 12/14* (2006.01)

(52) U.S. Cl. ............ 380/28; 380/30; 380/269; 713/181; 713/189

(58) Field of Classification Search .................. None
See application file for complete search history.

(56) References Cited

U.S. PATENT DOCUMENTS

| | | | | |
|---|---|---|---|---|
| 7,570,759 B2 * | 8/2009 | Liu | .................. | 380/28 |
| 7,599,489 B1 * | 10/2009 | Spracklen | .................. | 380/28 |
| 7,684,563 B1 * | 3/2010 | Olson et al. | .................. | 380/28 |
| 7,697,682 B2 | 4/2010 | Tsuruga | | |

FOREIGN PATENT DOCUMENTS

| | | |
|---|---|---|
| EP | 1351432 A1 | 10/2003 |
| JP | 2002-287635 | 10/2002 |
| JP | 2004-53716 | 2/2004 |
| JP | 2006-39000 | 2/2006 |

(Continued)

OTHER PUBLICATIONS

Tugba Siltu Celebi, Design an FPGA Implementation of Hash Processor, Dec. 2007, pp. 50-104.*

(Continued)

*Primary Examiner* — Philip Chea
*Assistant Examiner* — Fatoumata Traore
(74) *Attorney, Agent, or Firm* — Nelson Mullins Riley & Scarborough LLP; EuiHoon Lee, Esq.

(57) ABSTRACT

An apparatus for hash cryptography has a hardware structure that is capable of providing both secure hash algorithm (SHA)-1 hash calculation and SHA-256 hash calculation. The apparatus for hash cryptography generates a plurality of first message data corresponding to a plurality of first rounds when the SHA-1 hash calculation is performed and generates a plurality of second message data corresponding to a plurality of second rounds when the SHA-256 hash calculation is performed by using one memory, one first register, one XOR calculator, and one OR calculator, calculates a message digest by the SHA-1 hash calculation by using the plurality of first message data when the SHA-1 hash calculation is performed, and calculates a message digest by the SHA-256 by using the plurality of second message data when the SHA-256 hash calculation is performed.

18 Claims, 7 Drawing Sheets

FOREIGN PATENT DOCUMENTS

KR 100581662 B1 5/2006

OTHER PUBLICATIONS

Choi, Yongie et al., "Low power implementation of SHA-1 algorithm for RFID system," Proceedings of 2006 IEEE Tenth International Symposium on Consumer Electronics, pp. 1-5 (2006).

Dominikus, Sandra, "A Hardware Implementation of MD4-Family Hash Algorithms," 9th International Conference on Electronics, Circuits and Systems, vol. 3:1143-1146 (2002).

Nist, "Secure Hash Algorithms," Federal Information Processing Standards Publication 180-2, pp. 15-23 (2002).

* cited by examiner

US 8,275,126 B2

APPARATUS AND METHOD FOR HASH CRYPTOGRAPHY

CROSS-REFERENCE TO RELATED APPLICATION

This application claims priority to and the benefit of Korean Patent Application No. 10-2008-0124199 filed in the Korean Intellectual Property Office on Dec. 8, 2008, the entire contents of which are incorporated herein by reference.

BACKGROUND OF THE INVENTION (a) Field of the Invention

The present invention relates to an apparatus and a method for hash cryptography, and more particularly, to an apparatus and a method for hash cryptography adopted in a mobile phone platform embedded system.

(b) Description of the Related Art

A trusted platform module (hereinafter, referred to as "TPM"), as a microcontroller which is based on the industrial standard established by the Trusted Computing Group (hereinafter, referred to as "TCG"), is used for computing security with reliability by a combination of hardware and software, and a cryptography algorithm and a hash algorithm are implemented by hardware therein.

Recently, with rapid development of wireless network technology, since a digital information society is enhanced and electronic commerce is activated, a cryptography technology is recognized as a core technology for a society based on a high-speed Internet network, stability and reliability in economic activities, protection of user's privacy, etc. In particular, a mobile platform such as a mobile phone may be attacked by hackers or malicious programs unless proper security action is provided.

A mobile phone working group (hereinafter, referred to as "WPWG") of the TCG extends security standards of the TCG so as to be suitable for the mobile phone. In these security standards, a mobile trusted module (hereinafter, referred to as "MTM"), which is an essential security module for the mobile phone, is designated to use a secure hash algorithm (SHA)-1 that does not use a key in order to measure and verify the integrity of a corresponding platform. However, recently, use of a secure hash algorithm (SHA)-256 has been recommended and clarified in order to stably use the hash algorithm. Therefore, in the mobile phone, a cryptography apparatus for the integrity of the platform and user authentication and data authentication must be able to support both the SHA-1 and the SHA-256 so as to selectively use the SHA-1 or the SHA-256 according to a mobile environment.

Further, since most mobile devices have a limit in memory, a usable power supply, and computing performance, several technical difficulties occur in adopting the security standards of the TCG to the mobile phone. In particular, since the mobile phone has a limited battery capacity, additional driving of cryptograph calculation further shortens the lifespan of the battery. Therefore, the cryptography apparatus in the mobile phone requires a technology having low-power consumption and low-area optimized hardware.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus and a method for hash cryptography having an advantage of selectively using an SHA-1 or an SHA-256.

The present invention has also been made in an effort to provide a low-power consumption and low-area optimized apparatus, and a method for hash cryptography.

An exemplary embodiment of the present invention provides an apparatus for hash cryptography that includes a message scheduler, a message compressor, and a controller. The message scheduler generates a plurality of first message data using calculation data when a first hash calculation is performed, and generates a plurality of second message data using the calculation data when a second hash calculation is performed. The message compressor calculates a first message digest by performing the first hash calculation by using the plurality of first message data when the first hash calculation is performed, and calculates a second message digest by performing the second hash calculation by using the plurality of second message data when the second hash calculation is performed. The controller determines hash calculation to be performed with respect to the calculation data of the first and second hash calculations from a control command received from the outside, and determines the number of times to perform the hash calculation depending on the length of the calculation data to control the message scheduler and the message compressor depending on the determined hash calculation and the determined number of times.

A second embodiment of the present invention provides a message scheduler that generates a plurality of first and second message data required for first and second hash calculations, respectively, in the apparatus for hash cryptography. The message scheduler includes a memory, a register, an XOR calculator, a rotation shift calculator, a logic calculator, and an OR calculator. The memory divides and stores block data to be calculated into N sub-block data, and the register stores and outputs input data. The XOR calculator operates when the first hash calculation is performed, and updates the data of the register by XOR-calculating the sub-block data stored in the memory and the data stored in the register. The rotation shift calculator rotation-shifts and outputs the data stored in the register after the XOR calculation is repeatedly performed a predetermined number of times by the XOR calculator. The logic calculator that operates when the second hash calculation is performed and performs corresponding logic calculation among a plurality of logic calculations with respect to any one of the sub-block data stored in the memory. The OR calculator updates the data of the register by OR-calculating the data outputted from the logic calculator and the data stored in the register.

The N sub-block data and the output data of the rotation shift calculator are respectively used as the plurality of first message data when the first hash calculation is performed, the data by the OR calculation after the corresponding logic calculation and the OR calculation are repeatedly performed with respect to the N sub-block data and the second message data of a predetermined number are used as the plurality of second message data when the second hash calculation is performed, and the data by the OR calculation is used as the plurality of second message data after the corresponding logic calculation and the OR calculation are repeatedly performed with respect to the N sub-block data and the second message data of a predetermined number when the second hash calculation is performed.

A third embodiment of the present invention provides a message compressor that performs hash calculation with respect to block data to be calculated in the apparatus for hash cryptography to calculate a message digest. The message compressor includes a plurality of registers and an OR calculator. The plurality of registers store and output inputted data, and are connected to each other in a structure in which data outputted from a former register is inputted into a latter register. The OR calculator OR-calculates first data selected among a plurality of inputted first data and data stored in a first register among the plurality of registers to update the data of the first register when a first hash calculation is performed, and OR-calculates second data selected among a plurality of inputted second data and data stored in a second register among the plurality of registers to update the data of the second register when a second hash calculation is performed. At this time, a first round calculation is performed, which stores the data outputted from the OR calculator in a third register that is positioned at a first location of the plurality of registers after repeatedly performing the OR calculation a first number of times while changing selection of the first data and operates the plurality of registers as shift registers when the first hash calculation is performed, and a message digest according to the first hash calculation is calculated by repeatedly performing the first round calculation a predetermined number of times of rounds. At this time, a second round calculation is performed, which stores the data outputted from the OR calculator in the third register after repeatedly performing the OR calculation a second number of times while changing selection of the second data and operates the plurality of registers as the shift registers when the second hash calculation is performed, and a message digest according to the second hash calculation is calculated by repeatedly performing the second round calculation a predetermined number of times of rounds.

A fourth embodiment of the present invention includes: dividing calculation data received from the outside into N block data and storing the block data in a memory; storing the N block data in a register; generating the N block data stored in the register as first message data to be used in first to N-th rounds when a first hash calculation is performed; generating the first message data of a corresponding round by performing XOR calculation a predetermined number of times by using one XOR calculator on the basis of the first message data and the data stored in the register in each of (N+1)-th to M-th rounds when a first hash calculation is performed; generating the N block data stored in the register as second message data to be used in the first to N-th rounds when a second hash calculation is performed; generating the second message data of a corresponding round by performing XOR calculation a predetermined number of times by using one OR calculator on the basis of the second message data and the data stored in the register in each of (N+1)-th to K-th rounds when the second hash calculation is performed; calculating a first message digest by using M first message data corresponding to first to M-th rounds when the first hash calculation is performed; and calculating a second message digest by using second message data corresponding to first to K-th rounds when the second hash calculation is performed.

According to an embodiment of the present invention, the present invention can be adopted as a core element technology for verifying the integrity of systems and protecting user information in various security platforms that require a low-power consumption hash function, such as a trusted computing system for a mobile platform, an RFID system, a wireless network system, a sensor network system, a home network system, etc.

Further, it is possible to minimize power consumed by a hardware resource that does not process data by applying a clock signal only at the time when data stored in a register is changed.

DETAILED DESCRIPTION OF THE EMBODIMENTS

Figure 1:
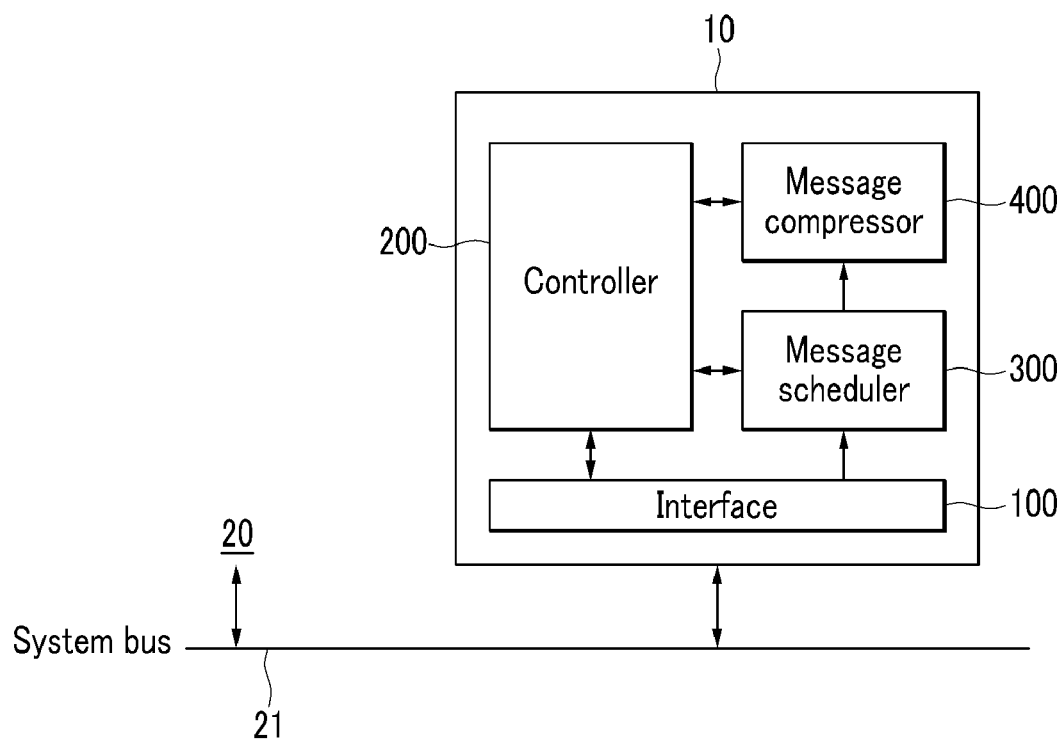
FIG. 1 is a block diagram of an apparatus for hash cryptography according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and the appended claims, unless explicitly described to the contrary, the word "comprise" and variations such as "comprises" or "comprising" will be understood to imply the inclusion of stated elements but not the exclusion of any other elements. In addition, the terms "-er", "-or", "module", and "block" described in the specification mean units for processing at least one function and operation, and can be implemented by hardware components or software components and combinations thereof.

Hereinafter, an apparatus and a method for hash cryptography according to an exemplary embodiment of the present invention will be described in detail with reference to the accompanying drawings.

Figure 2:
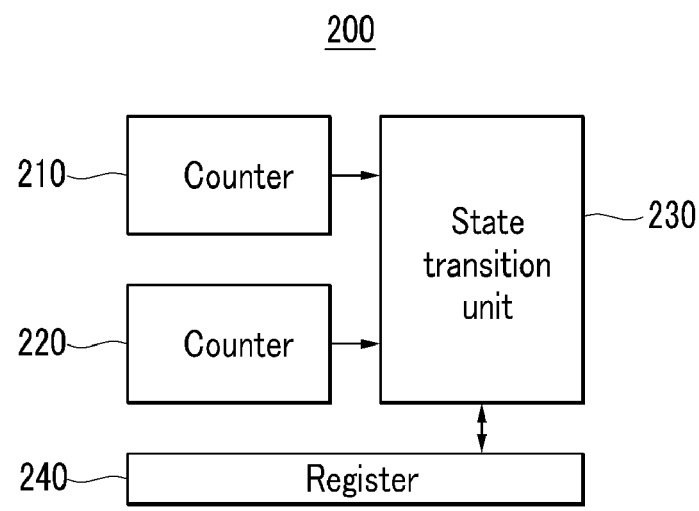
FIG. 2 is a block diagram illustrating a control unit shown in FIG. 1.

FIG. 1 is a block diagram of an apparatus for hash cryptography according to an exemplary embodiment of the present invention, and FIG. 2 is a block diagram illustrating a control unit shown in FIG. 1.

Referring to FIG. 1, the hash cryptography apparatus 10 includes an interface 100, a controller 200, a message scheduler 300, and a message compressor 400.

The interface 100 interfaces with a microprocessor of a system 20 through a system bus 21 of the system adopting the hash cryptography apparatus 10, receives data and a control signal indicating the start and stop of SHA-1/SHA-256 hash calculation from the microprocessor of the system 20, and transfers the result value to the microprocessor of the system 20 when the SHA-1/SHA-256 hash calculation is terminated.

The controller 200 manages and controls general data flow required for the SHA-1/SHA-256 hash calculation. More specifically, the controller 200 controls input and output of data through the interface 100, stores corresponding control commands when the inputted data are the control commands by checking addresses of the inputted data, and stores calculation data in the message scheduler 300 when the inputted data are the calculation data that will be subjected to the SHA-1/SHA-256 hash calculation. The controller 200 determines whether the hash calculation to be performed is the SHA-1 hash calculation or the SHA-256 calculation by examining the stored control commands and divides the calculation data into 512 bits of block data on the basis of the length of the inputted calculation data inputted through the interface 100. Herein, the number of times of performing the SHA-1/SHA-256 is determined depending on the number of block data. For example, when the length of the calculation data is 1024 bits, the calculation data is divided into two block data, such that the SHA-1/SHA-256 hash calculation for a block data including higher bits is performed, and thereafter, the SHA-1/SHA-256 hash calculation for a block data including lower bits is performed.

The controller 200 generates control signals required for the determined hash operation by referring to the stored control commands and transfers the generated control signals to the interface 100, the message scheduler 300, and the message compressor 400.

In the SHA-1/SHA-256 hash calculation, message digests of 160 and 256 bits are respectively calculated by receiving data having a length of maximum $2^{64}$ bits. The SHA-1/SHA-256 hash calculation is performed by using the 512 bits of data as a basic block unit in order to calculate the message digest, the SHA-1 hash calculation for one basic block data is performed throughout 80 rounds, and the SHA-256 hash calculation is performed throughout 64 rounds. Therefore, the SHA-1/SHA-256 hash calculation for 1024 bits of calculation data can be performed at two times. That is, the SHA-1/SHA-256 hash calculation for higher 512 bits is performed throughout 80/64 rounds, and thereafter, the SHA-1/SHA-256 hash calculation for lower 512 bits can be performed throughout 80/64 rounds.

Further, the controller 200 controls an operation to store performance sequences and calculation results of calculations required for driving internal hardware modules of the message scheduler 300 and the message compressor 400 throughout 80/64 rounds.

Referring to FIG. 2, the controller 200 includes counters 210 and 220, a state transition unit 230, and a register 240.

The counter 210 counts information on rounds in which the SHA-1/SHA-256 hash calculation is performed, while the SHA-1/SHA-256 hash calculation is performed and provides information on a currently performed round to the state transition unit 230. The counter 210 may be used as an 8-bit counter.

The counter 220 stores process information of an internal clock cycle in a currently performed round and provides the information to the state transition unit 230. At this time, the counter 210 may be used as a 4-bit counter.

The state transition unit 230 has states of a finite number for the SHA-1/SHA-256 hash calculation and is state-transitioned from a current state to another state depending on an input given based on information on the currently performed round, and the process information of the internal clock cycle from the counters 210 and 220. Therefore, the state transition unit 230 is synchronized to generate a control signal and transfers the generated control signal to the interface 100, the message scheduler 300, and the message compressor 400.

The register 240 stores the inputted control commands. Referring back to FIG. 1, the message scheduler 300 stores inputted block data, and generates 80/60 message data $W_t$ required for the SHA-1/SHA-256 hash calculation that is performed throughout 80/60 rounds from the block data, and provides the message data $W_t$ corresponding to each round to the message compressor 400. At this time, the message data $W_t$ required for the SHA-1 hash calculation can be generated as shown in Equation 1, and the message data $W_t$ required for the SHA-256 hash calculation can be generated as shown in Equation 2.

That is, as expressed in Equations 1 and 2, as the message data $W_t$ used for the hash calculation from a first round to a sixteenth round, sixteen 32-bit sub-block data $M_1$ to $M_{16}$ dividing 512-bit block data by 32 bits are used. Further, the message data Wt used for the SHA-1/SHA-256 hash calculation of $17^{th}$ to $80^{th}$/$17^{th}$ to $64^{th}$ rounds, additional data generated by using an established combinational logic circuit are used. Herein, $M_1$ is first sub-block data including data of higher 32 bits in block data of 512 bits, and $M_{16}$ is $16^{th}$ sub-block data including data of lower 32 bits in the block data of 512 bits.

$$W_t = \begin{cases} M_t & 1 \le t \le 16 \\ ROT_{LEFT1}(W_{t-3} \oplus W_{t-8} \oplus W_{t-14} \oplus W_{t-16}) & 17 \le t \le 80 \end{cases} \quad \text{(Equation 1)}$$

$$W_t = \begin{cases} M_t & 1 \le t \le 16 \\ ROT_{LEFT1}(W_{t-3} \oplus W_{t-8} \oplus W_{t-14} \oplus W_{t-16}) & 17 \le t \le 80 \end{cases}$$

Herein, t is the number of rounds, and $M_t$ is t-th sub-block data to be used in a t-th round in the block data of 512 bits and is sub-block data. ROT is rotate-shift calculation, and $ROT_{LEFT1}$ means calculation that moves left for each one bit. $\oplus$ is exclusive OR (XOR) operation that is performed by the bit unit. $\oplus$ $$W_t = \begin{cases} M_t & 1 \le t \le 16 \\ \sigma_1(W_{t-2}) + W_{t-7} + \sigma_0(W_{t-15}) + W_{t-16} & 17 \le t \le 64 \end{cases} \quad \text{(Equation 2)}$$

$$W_t = \begin{cases} M_t & 1 \le t \le 16 \\ \sigma_1(W_{t-2}) + W_{t-7} + \sigma_0(W_{t-15}) + W_{t-16} & 17 \le t \le 64 \end{cases}$$

Herein, t is the number of rounds, and + is a modular adding operation. $\sigma_0$ and $\sigma_1$ are logic functions and can be expressed as shown in Equation 3 and Equation 4, respectively. $\sigma_0$ $$\sigma_0(x) = S^7(x) \oplus S^{18}(x) \oplus R^3(x)$$

$$\sigma_0(x) = S^7(x) \oplus S^{18}(x) \oplus R^3(x) \quad \text{(Equation 3)}$$

$$\sigma_1(x) = S^{17}(x) \oplus S^{19}(x) \oplus R^{10}(x)$$

$$\sigma_1(x) = S^{17}(x) \oplus S^{19}(x) \oplus R^{10}(x) \quad \text{(Equation 4)}$$

In Equations 3 and 4, $R^N$ is calculation in which N bits are shifted right and means operation in which the shifted bits are filled with "0", and $S^N$ means operation in which N bits are rotated right.

The message compressor 400 performs the SHA-1/SHA-256 hash calculation throughout 80/64 rounds for the message data $W_t$ of 32 bits provided from the message scheduler 300, and stores the message digest which is the result value. At this time, the SHA-1 hash calculation and the SHA-256 hash calculation can be performed as shown in Equations 5 and 6.

As expressed in Equations 5 and 6, five variables a to e are used for the SHA-1 hash calculation and eight variables a to h are used for the SHA-256 hash calculation. These variables are shifted by each one step depending on the round, or store different values depending on predetermined calculation.

$$a_t = f_t(b_{t-1}, c_{t-1}, d_{t-1}) + e_{t-1} + ROT_{LEFT5}(a_{t-1}) + W_t + K_t;$$

$$b_t = a_{t-1}; c_t = ROT_{LEFT30}(b_{t-1}); d_t = c_{t-1}; e_t = d_{t-1}$$

$$a_t = f_t(b_{t-1}, c_{t-1}, d_{t-1}) + e_{t-1} + ROT_{LEFT5}(a_{t-1}) + W_t + K_t;$$

$$b_t = a_{t-1}; c_t = ROT_{LEFT30}(b_{t-1}); d_t = c_{t-1}; e_t = d_{t-1} \quad \text{(Equation 5)}$$

$T_1 = h + \Sigma i)e) + Ch(e,f,g) + K_t W_t;$ $T_2 = \Sigma_0(a) + Maj(a,b,c);$ $h = g; g = f; f = e; e = d + T_1;$ $d = c; c = b; b = a; a = T_1 T_2$ $T_1 = h + \Sigma i)e) + Ch(e,f,g) + K_t W_t;$ $T_2 = \Sigma_0(a) + Maj(a,b,c);$ $h = g; g = f; f = e; e = d + T_1;$ $d = c; c = b; b = a; a = T_1 T_2$ (Equation 6)

In Equation 5, $K_t$ is a round constant defined in the SHA-1 hash calculation, and has a predetermined value depending on the calculated round. $f_t$ is a logic function used in the SHA-1 hash calculation and can be expressed as shown in Equation 7.

Further, in Equation 6, Ch, Maj, $\Sigma_0$, and $\Sigma_1$ are logic functions and can be expressed as shown in Equations 8 to 11.

$f_t(b,c,d) = (b \wedge c)$ or $(\text{not } b \wedge d)$ $1 \leq t \leq 20$ $f_t(b,c,d) = (b \oplus c \oplus d)$ $21 \leq t \leq 40, 61 \leq t \leq 80$ $f_t(b,c,d) = (b \wedge c)$ or $(b \wedge d)$ or $(c \wedge d)$ $41 \leq t \leq 60$ $f_t(b,c,d) = (b \wedge c)$ or $(\text{not } b \wedge d)$ $1 \leq t \leq 20$ $f_t(b,c,d) = (b \alpha c \oplus d)$ $21 \leq t \leq 40, 61 \leq t \leq 80$ $f_t(b,c,d) = (b \wedge c)$ or $(b \wedge d)$ or $(c \wedge d)$ $41 \leq t \leq 60$ (Equation 7)

$Ch(x,y,z) = (x \wedge y) \oplus (\bar{x} \wedge z)$ $Ch(x,y,z) = (x \wedge y) \oplus (\bar{x} \wedge z)$ (Equation 8)

$Maj(x,y,z) = (x \wedge y) \oplus (x \wedge z) \oplus (y \wedge z)$ $Maj(x,y,z) = (x \wedge y) \oplus (x \wedge z) \oplus (y \wedge z)$ (Equation 9)

In Equations 8 and 9, ^ is "AND" operation that is performed by the bit unit.

$\Sigma_0(x) = S^2(x) \oplus S^{13}(x) \oplus S^{22}(x)$ $\Sigma_0(x) = S^2(x) \oplus S^{13}(x) \oplus S^{22}(x)$ (Equation 10)

$\Sigma_1(x) = S^6(x) \oplus S^{11}(x) \oplus S^{25}(x)$ $\Sigma_1(x) = S^6(x) \oplus S^{11}(x) \oplus S^{25}(x)$ (Equation 11)

Next, a hardware structure of a message scheduler according to an exemplary embodiment of the present invention will be described in detail with reference to FIGS. 3 to 5.

Figure 3:
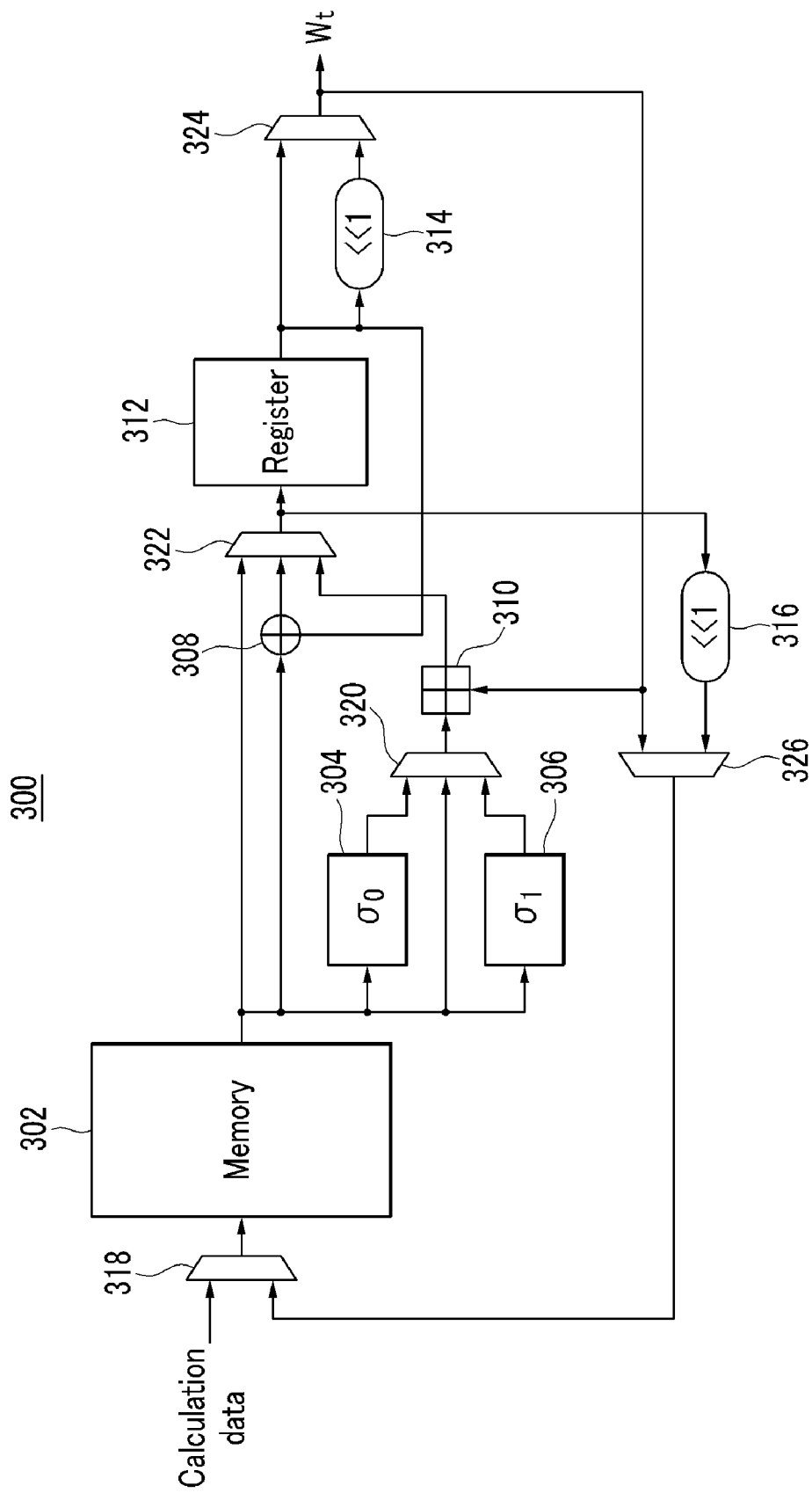
FIG. 3 is a diagram illustrating a hardware structure of a message scheduler according to an exemplary embodiment of the present invention.

FIG. 3 is a diagram illustrating a hardware structure of a message scheduler according to an exemplary embodiment of the present invention. FIGS. 4 and 5 are diagrams illustrating a hardware structure for generating message data in an SHA-1 and an SHA-256, respectively.

Referring to FIG. 3, the message scheduler 300 includes a memory 302, logic function calculators 304 and 306, an "XOR" calculator 308, an "OR" calculator 310, a register 312, rotation shift calculators 314 and 316, and selectors 318, 320, 322, 324, and 326. The memory 302, logic function calculators 304 and 306, "XOR" calculator 308, "OR" calculator 310, register 312, rotation shift calculators 314 and 316, and selectors 318, 320, 322, 324, and 326 operate in accordance with the control signal transferred from the controller 200. In FIG. 3, logic functions that the logic function calculators 304 and 305 will perform are expressed by $\sigma_0$ and $\sigma_1$, and calculation that the rotation shift calculators 314 and 316 will perform are expressed by $\ll 1$.

The memory 302 has an input terminal and an output terminal, and stores the block data of 512 bits that are transmitted from the microprocessor of the system 20. The logic function calculators 304 and 306 have input terminals and output terminals. Calculations required for the SHA-256 hash calculation, which correspond to Equations 3 and 4, are performed with respect to data inputted through the input terminals, which are outputted through the output terminals.

The XOR calculator 308 has two input terminals and an output terminal, and multiplies and outputs data inputted through the two input terminals through the output terminal. That is, the XOR calculator 308 performs calculation corresponding to "$\oplus$" of Equation 1 required for the SHA-1 hash calculation.

The OR calculator 310 has two input terminals and an output terminal, and adds and outputs data inputted into the two input terminals through the output terminal.

The register 312 has an input terminal and an output terminal, and stores data inputted into the input terminal and outputs the stored data through the output terminal. In the embodiment of the present invention, the calculation of Equation 1 corresponding to $17^{th}$ to $80^{th}$ rounds is performed by using one XOR calculator 308, and the calculation of Equation 2 corresponding to $17^{th}$ to $64^{th}$ rounds is performed by one OR calculator 310. For this, since one XOR calculator 308 repeats multiplication calculation four times and one OR calculator 310 also repeats addition calculation four times, previous calculation values, i.e., intermediate values, are stored in the register 312 in calculating the message data $W_t$ required for the SHA-1/SHA-256 hash calculation.

The rotation shift calculators 314 and 316 have input terminals and output terminals, and rotate data inputted through the input terminals to the right by 1 bit and outputs the data through the output terminals. That is, the rotation shift calculators 314 and 316 perform calculation corresponding to "$ROT_{LEFT1}$" of Equation 1.

Each of the selectors 318, 324, and 326 has two input terminals and an output terminal, and selects any one of data inputted through the two input terminals depending on the SHA-1/SHA-256 hash calculation determined in the controller 200 and outputs the data through the output terminal. Further, each of the selectors 320 and 322 has three input terminals and an output terminal, and selects any one of data inputted through the three input terminals depending on the SHA-1/SHA-256 hash calculation determined in the controller 200 and outputs the data through the output terminal.

More specifically, a second input terminal of the selector 318 that receives the block data of 512 bits from a first input terminal is connected to the output terminal of the selector 326, and the output terminal of the memory 302 of which the input terminal is connected to the output terminal of the selector 318 is connected to first input terminals of the selectors 320 and 322, input terminals of the logic function calculators 304 and 306, and a first input terminal of the XOR calculator 308. The output terminals of the logic function calculators 304 and 306 are connected to second and third input terminals of the selector 320, respectively, and the output terminal of the selector 320 is connected to a first input terminal of the OR calculator 310. The output terminal of the XOR calculator 308 and the output terminal of the OR calculator 310 are connected to second and third input terminals of the selector 322, respectively, and the output terminal of the selector 322 is connected to the input terminal of the register 312 and the input terminal of the rotation shift calculator 316. Further, the output terminal of the register 312 is connected to a first input terminal of the selector 324, the input terminal of the rotation shift calculator 314, and a second input terminal of the XOR calculator 308. A second input terminal of the selector 324 is connected to the output terminal of the rotation shift calculator 314, the output terminal of the selector 324 and the output terminal of the rotation shift calculator 316 are connected to first and second input terminals, respectively, and the output terminal of the selector 326 is connected to the input terminal of the selector 318. At this time, data outputted through the output terminal of the selector 324 is message data $M_t$ in a corresponding round.

Step-by-step detailed operations for the SHA-1 hash calculation in the message scheduler 300 are performed as shown in Table 1. Table 1 shows the step-by-step detailed operations for the SHA-1 hash calculation.

In Table 1, "x" represents that no value is relevant to the entire calculation, and "→" represents the same value as a value of a left blank. "Mout" represents data outputted from the memory 302, "M1" and "M2" represent data outputted from the selectors 322 and 324, respectively, and "R1" represents data outputted from the register 312. Further, "reg_w" represents data stored in the register 312, and "<<(reg_w)$_t$" represents data in which data stored in the register 312 in a "t" round is rotated to the left by 1 bit.

TABLE 1

| Round (t) | Clock cycle | Step-by-step operation of message scheduler for SHA-1 calculation | | | |
|---|---|---|---|---|---|
| | | Mout | M1 | R1 | M2 |
| 1-16 | 1 | $M_t$ | → | → | → |
| 17-80 | ① | $M_{t-16}$ | → | → | X |
| | ② | $M_{t-14}$ | reg_w$\oplus M_{t-14}$ | $M_{t-16}\oplus M_{t-14}$ | X |
| | ③ | $M_{t-8}$ | reg_w$\oplus M_{t-8}$ | $M_{t-16}\oplus M_{t-14}\oplus M_{t-8}$ | X |
| | ④ | $M_{t-3}$ | reg_w$\oplus M_{t-3}$ | $M_{t-16}\oplus M_{t-14}\oplus M_{t-8}\oplus M_{t-3}$ | <<1(reg_w) |

First, in accordance with the control signal of the controller 200, the memory 302, XOR calculator 308, selectors 318, 322, and 324, register 312, and rotation shift calculators 314 and 316 of the message scheduler 300 serve as the logic calculator for the SHA-1 hash calculation to generate the message data $W_t$ in $1^{st}$ to $80^{th}$ rounds to be used for the SHA-1 hash calculation.

Referring to Table 1, the message scheduler 300 generates the message data $W_t$ to be used in $1^{st}$ to $16^{th}$ rounds throughout one clock cycle by using the block data of 512 bits. That is, when the block data of 512 bits are inputted through the interface 100, the block data are stored in the memory 302 through the selector 318. The block data stored in the memory 302 are stored in the register 312 through the selector 322. Thereafter, the register 312 sequentially outputs t-th sub-block data to the message compressor 400 through the selector 324 among the block data stored until t is changed from 1 to 16. At this time, the sub-block data outputted to the message compressor 400 are used as the message data $W_t$ in the corresponding round.

Next, the message scheduler 300 generates the message data $W_t$ in each of $16^{th}$ to $80^{th}$ rounds throughout four clock cycles 1 to 4.

More specifically, in the clock cycle 1, the memory 302 outputs (t-16)-th sub-block data $M_{t-16}$ from the block data of 512 bits stored in the memory 302. The sub-block data $M_{t-16}$ outputted from the memory 302 is stored in the register 312 through the selector 322. In addition, the sub-block data $M_{t-16}$ stored in the register 312 is inputted into the second input terminal of the XOR calculator 308.

Subsequently, in the clock cycle 2, the memory 302 outputs (t-14)-th sub-block data $M_{t-14}$ to the first input terminal of the XOR calculator 308 from the stored block data of 512 bits. The XOR calculator 308 multiplies and outputs the data $M_{t-16}$ and $M_{t-14}$ that is inputted into two input terminals. The data $M_{t-14}|M_{t-16}$ that is outputted from the XOR calculator 308 are stored in the register 312 through the selector 322. In addition, the $M_{t-14}\oplus M_{t-16}$ that is stored in the register 312 is inputted into the second input terminal of the XOR calculator 308.

In the clock cycle 3, the memory 302 outputs (t-8)-th sub-block data $M_{t-8}$ to the first input terminal of the XOR calculator 308 from the stored block data of 512 bits.

The XOR calculator 308 multiplies and outputs the data $M_{t-8}$ and $M_{t-14}\oplus M_{t-16}$ that that are inputted into the two input terminals thereof. The data $M_{t-8}\oplus M_{t-14}\oplus M_{t-16}$ that are outputted from the XOR calculator 308 are stored in the register 312 through the selector 322. The data $M_{t-8}\oplus M_{t-14}\oplus M_{t-16}$ that that are stored in the register 312 are inputted into the second input terminal of the XOR calculator 308 again.

Lastly, in the clock cycle 4, the memory 302 outputs (t-3)-th sub-block data $M_{t-3}$ to the first input terminal of the XOR calculator 308 from the stored block data of 512 bits. The XOR calculator 308 multiplies and outputs the data $M_{t-3}\oplus M_{t-8}\oplus M_{t-14}\oplus M_{t-16}$ that are inputted into the two input terminals thereof. The data $M_{t-3}\oplus M_{t-8}\oplus M_{t-14}\oplus M_{t-16}$ that are outputted from the XOR calculator 308 is stored in the register 312 through the selector 322. Further, the data $M_{t-3}\oplus M_{t-8}\oplus M_{t-14}\oplus M_{t-16}$ that are outputted from the XOR calculator 308 is inputted into the rotation shift calculator 316 through the selector 322.

The data $M_{t-3}\oplus M_{t-8}\oplus M_{t-14}\oplus M_{t-16}$ that is stored in the register 312 is outputted to the rotation shift calculator 314. The rotation shift calculator 314 rotates the data $M_{t-3}\oplus M_{t-8}\oplus M_{t-14}\oplus M_{t-16}$ to the left by 1 bit and outputs the data. The data "<<1(reg_w)$_t$" outputted from the rotation shift calculator 314 is inputted into the message compressor 400 through the selector 324, and the data "<<1(reg_w)$_t$" outputted from the selector 324 is used as the message data Wt in the t-th round.

The rotation shift calculator 316 rotates the data $M_{t-3}\oplus M_{t-8}\oplus M_{t-14}\oplus M_{t-16}$ to the left by 1 bit and outputs the data. The data "<<1(reg_w)$_t$" outputted from the rotation shift calculator 316 is stored at the position $M_{t-18}$ of the sub-block data of the memory 302 through the selectors 326 and 318.

On the other hand, the data "<<1(reg_w)$_t$" outputted from the selector 324 is stored at the position $M_{t-18}$ of the sub-block data of the memory 302 through the selectors 326 and 318. Like this, in the case when the data "<<1(reg_w)$_t$" outputted from the selector 324 is stored at the position $M_{t-18}$ of the sub-block data of the memory 302 through the selectors 326 and 318, the rotation shift calculator 316 and the multiplexer 326 can be removed, but the number of clock cycles required for message data calculation of one round can be increased by one clock.

Like this, when the last clock cycle 4 is terminated, the message data of one round $W_t$ is generated.

Therefore, the message scheduler 300 generates and outputs the message data $W_t$ in $17^{th}$ to $80^{th}$ rounds to the message compressor 400 by repeating the steps 1 to 4 in each of $17^{th}$ to $80^{th}$ rounds, and the generated message data $W_t$ are stored in the position $M_{t-16}$ of the sub-block data of the memory 302. As a result, an access address of the memory 302 can be defined as (i mod $2^4$) when a round to be calculated is set to i.

Further, the step-by-step detailed operations for the SHA-256 hash calculation in the message scheduler 300 are performed as shown in Table 2. Table 2 shows the step-by-step detailed operations for the SHA-256 hash calculation. In Table 2, "x" represents that no value is relevant to the entire calculation, and "→" represents the same value as data of a left blank. "Mout" represents data outputted from the memory 302, "M1" and "M3" represent data outputted from the selectors 322 and 320, respectively, and "R1" represents data outputted from the register 312. Further, "A1" represents data outputted from the OR calculator 310.

TABLE 2

| Round | Clock | Step-by-step operations of message scheduler for SHA-256 calculation | | | |
|---|---|---|---|---|---|
| (t) | cycle | Mout | M3 | A1 | M1 | R1 |
| 1-16 | 1 | $M_t$ | X | X | $M_t$ | → |
| 17-64 | ① | $M_{t-16}$ | X | X | $M_{t-16}$ | → |
| | ② | $M_{t-15}$ | $\sigma_0(M_{t-15})$ | $M_{t-16} + \sigma_0(M_{t-15})$ | → | → |
| | ③ | $M_{t-7}$ | → | $M_{t-16} + \sigma_0(M_{t-15}) + M_{t-7}$ | → | → |
| | ④ | $M_{t-2}$ | $\sigma_1(M_{t-2})$ | $M_{t-16} + \sigma_0(M_{t-15}) + M_{t-7} + \sigma_1(M_{t-2})$ | → | → |

First, in accordance with the control signal from the controller 200, the memory 302, logic function calculators 304 and 306, OR calculator 310, selectors 318, 320, 322, 324, and 326, and register 312 of the message scheduler 300 serve as the logic calculator for the SHA-256 hash calculation to generate the message data $W_t$ in $1^{st}$ to $64^{th}$ rounds to be used for the SHA-256 hash calculation.

Referring to Table 2, the message scheduler 300 generates the message data $W_t$ to be used in $1^{st}$ to $16^{th}$ rounds throughout one clock cycle in the same manner as the SHA-1 hash calculation.

Next, the message scheduler 300 generates the message data $W_t$ in each of $16^{th}$ to $64^{th}$ rounds throughout four clock cycles 1 to 4.

More specifically, in the clock cycle 1, the memory 302 outputs the (t-16)-th sub-block data $M_{t-16}$ from the block data of 512 bits stored in the memory 302 to the selector 322. The sub-block data $M_{t-16}$ outputted from the memory 302 is stored in the register 312 through the selector 322. The data $M_{t-16}$ stored in the register 312 are inputted into the second input terminal of the OR calculator 310 through the selector 324.

In the clock cycle 2, the memory 302 outputs the (t-15)-th sub-block data $M_{t-15}$ from the block data of 512 bits stored in the memory 302 to the logic function calculator 304. The logic function calculator 304 performs calculation corresponding to Equation 3 with respect to the sub-block data $M_{t-16}$ and outputs the calculated data. Data "$\sigma_0(M_{t-15})$" outputted from the logic function calculator 304 is inputted into the first input terminal of the OR calculator 310 through the selector 320. The OR calculator 310 adds and outputs the data $\sigma_0(M_{t-15})$ and $M_{t-16}$ that are inputted into two input terminals. The data $\sigma_0(M_{t-15})+M_{t-16}$ that is outputted from the OR calculator 310 is stored in the register 312 through the selector 322. In addition, the data $\sigma_0(M_{t-15})+M_{t-16}$ that is stored in the register 312 is inputted into the second input terminal of the OR calculator 310 through the selector 324.

In the clock cycle 3, the memory 302 outputs the (t-7)-th sub-block data $M_{t-7}$ from the block data of 512 bits stored in the memory 302 to the selector 320. The data ($M_{t-7}$) outputted from the memory 302 is inputted into the first input terminal of the OR calculator 310 through the selector 320. The OR calculator 310 adds and outputs the data $M_{t-7}$ and $\sigma_0(M_{t-15})+M_{t-16}$ that are inputted into two input terminals.

The data $M_{t-7}+\sigma_0 M_{t-15}+M_{t-16}$ that is outputted from the OR calculator 310 are stored in the register 312 through the selector 322. In addition, the data $M_{t-7}+\sigma_0 M_{t-15}+M_{t-16}$ that is stored in the register 312 is inputted into the second input terminal of the OR calculator 310 through the selector 324.

In the last clock cycle 4, the memory 302 outputs the (t-2)-th sub-block data $M_{t-2}$ from the block data of 512 bits stored in the memory 302 to the logic function calculator 306. The logic function calculator 306 performs calculation corresponding to Equation 4 with respect to the sub-block data $M_{t-2}$ and outputs the calculated data. Data $\sigma_1(M_{t-2})$ outputted from the logic function calculator 306 is inputted into the first input terminal of the OR calculator 310 through the selector 320. The OR calculator 310 adds and outputs the data $\sigma_1(M_{t-2})$ and $M_{t-7}+\sigma_0 M_{t-15}+M_{t-16}$ that are inputted into two input terminals. The data $\sigma_1(M_{t-2})+M_{t-7}+\sigma_0(M_{t-15})+M_{t-16}$ that is outputted from the OR calculator 310 is stored in the register 312 through the selector 322. Further, the data $\sigma_1(M_{t-2})+M_{t-7}+\sigma_0 M_{t-15}+M_{t-16}$ that is stored in the register 312 is stored at the position Mt-16 of the sub-block data in the memory 302 through the selectors 324, 326, and 318. Like this, after the last clock cycle 4 is terminated, the data $\sigma_1(M_{t-2})+M_{t-7}+\sigma_0 M_{t-15}+M_{t-16}$ that is stored in the register is outputted to the message compressor 400 through the selector 324, and the data $\sigma_1(M_{t-2})+M_{t-7}+\sigma_0 M_{t-15}+M_{t-16}$ that is outputted from the selector 324 is used as the message data $W_t$ in the t-th round. Further, the data $\sigma_1(M_{t-2})+M_{t-7}+\sigma_0 M_{t-15}+M_{t-16}$ that is outputted from the selector 324 is stored in the position Mt-16 of the sub-block data of the memory 302 through the selectors 326 and 318.

That is, when the last clock cycle 4 is terminated, the message data of one round $W_t$ is generated. Therefore, the message scheduler 300 generates and outputs the message data $W_t$ in $17^{th}$ to $64^{th}$ rounds to the message compressor 400 by repeating the steps 1 to 4 in each of $17^{th}$ to $64^{th}$ rounds, and the generated message data $W_t$ are stored in the position $M_{t-16}$ of the sub-block data of the memory 302. As a result, the access address of the memory 302 can be defined as (i mod $2^4$) when a round to be calculated is set to i.

Figure 4:
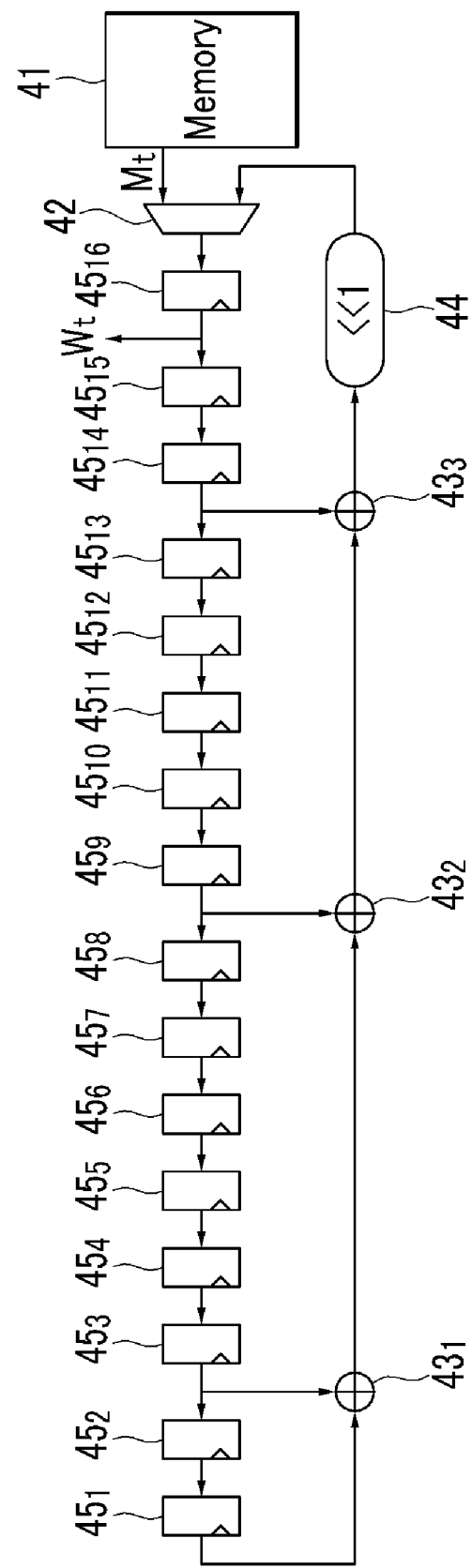
FIGS. 4 and 5 are diagrams illustrating a hardware structure for generating message data in an SHA-1 and an SHA-256, respectively.
Figure 5:
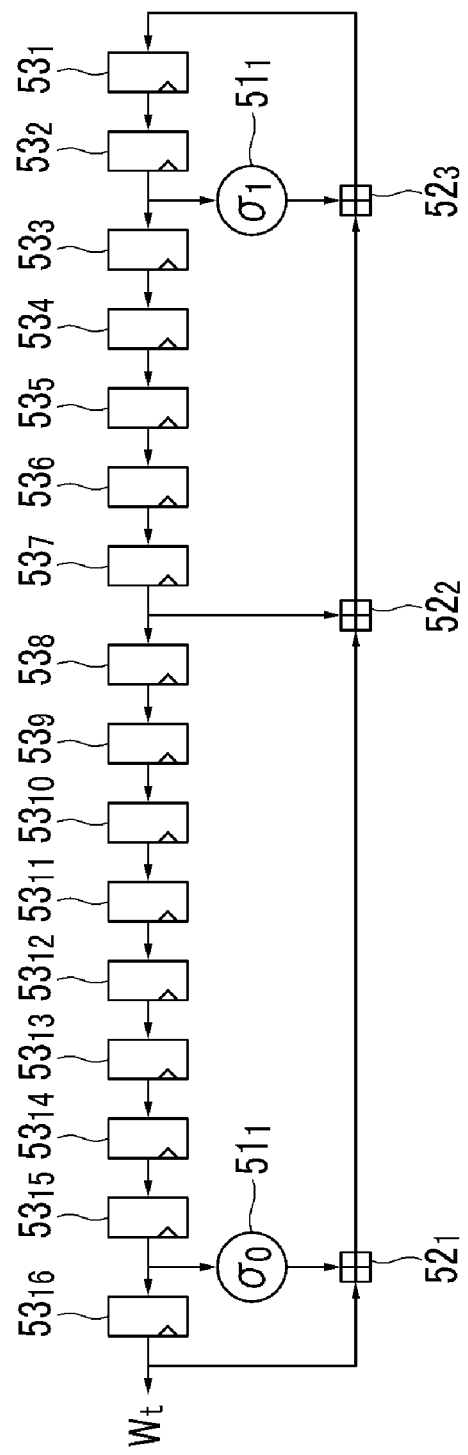

In general, for the calculation shown in Equation 1, a memory 41, a selector 42, three XOR calculators $43_1$ to $42_3$ for calculation of $W_{t-3} \oplus W_{t-8} \oplus W_{t-14} \oplus DW_{t-16}$, a rotation shift calculator 44 for performing calculation of "$ROT_{LEFT1}$", and sixteen registers $45_1$ to $45_{16}$ are required as shown in FIG. 4. Further, for the calculation shown in Equation 2, two logic function calculators $51_1$ and $51_2$ for calculation of $\sigma_1$ and $\sigma_0$, three OR calculators $52_1$ to $52_3$ for calculation of $\sigma_1(W_{t-2})+W_{t-7}+\sigma_0(W_{t-15})+W_{t-16}$, and sixteen registers $53_1$ to $53_{16}$ are required as shown in FIG. 5. However, as shown in FIGS. 4 and 5, since use of too many hardware resources increases a hardware area and power consumption, it is difficult to adopt the message scheduler in a mobile phone requiring small-area characteristics or a low-power embedded system.

However, the message scheduler 300 according to the embodiment of the present invention generates the message data Wt of $1^{st}$ to 80th/$1^{st}$ to $64^{th}$ rounds required for the SHA-1 and SHA-256 hash calculations by using one register 312, one OR calculator 310, and one XOR calculator 308, thereby minimizing the hardware area and the power consumption. Further, unlike FIG. 4, the message scheduler 300 according to the embodiment of the present invention can maximize the utilization of the memory 302 by using the memory 302 even after the 16$^{th}$ round.

Next, a hardware structure of a message compressor according to an exemplary embodiment of the present invention will be described in detail with reference to FIGS. 6 to 8.

Figure 6:
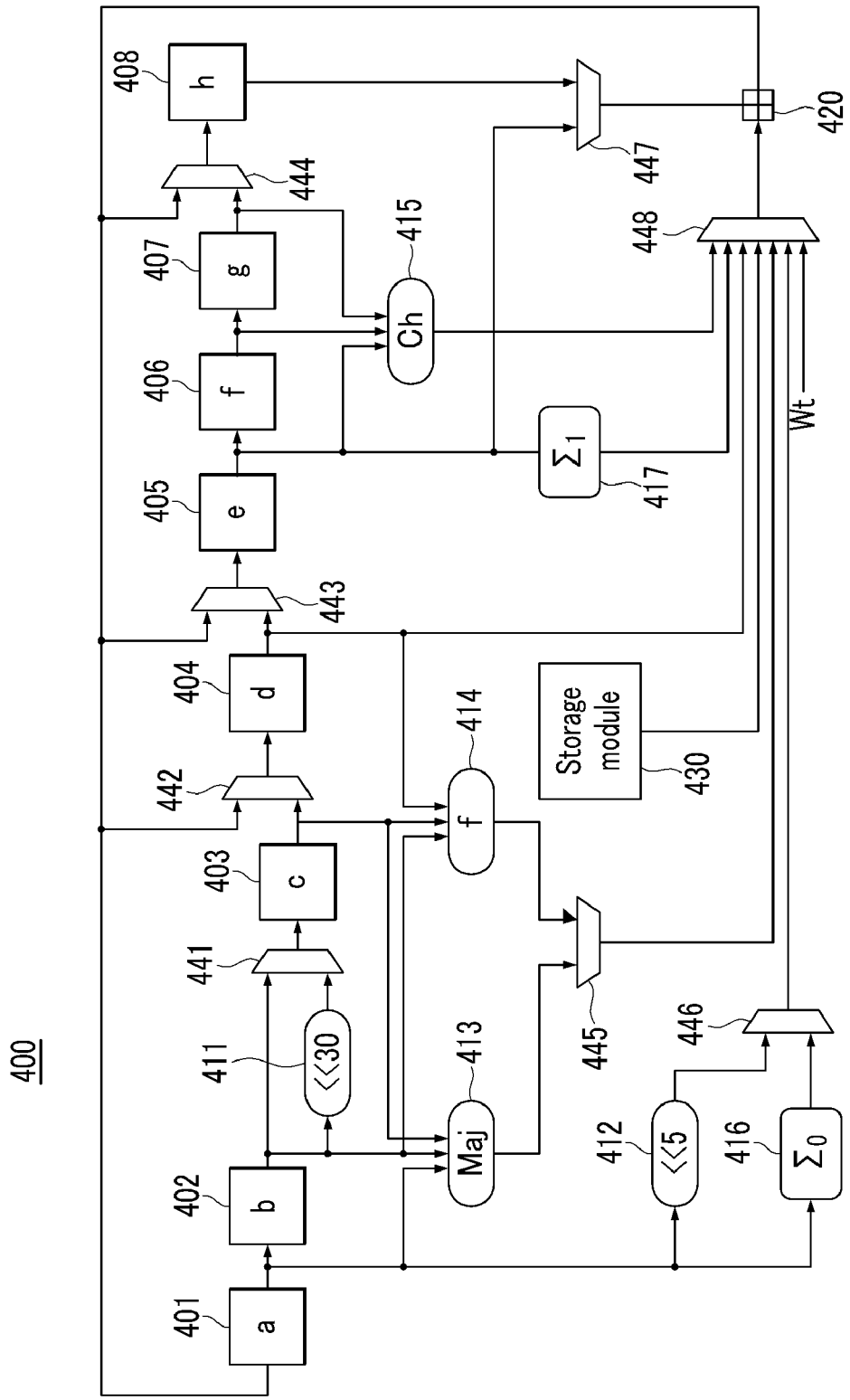
FIG. 6 is a diagram illustrating a hardware structure of a message compression unit according to an exemplary embodiment of the present invention.

FIG. 6 is a diagram illustrating a hardware structure of a message compression unit according to an exemplary embodiment of the present invention. FIGS. 7 and 8 are diagrams illustrating a hardware structure for calculating a message digest in an SHA-1 and an SHA-256, respectively.

Referring to FIG. 6, the message compressor 400 includes registers 401 to 408, rotation shift calculators 411 and 412, logic function calculators 413 to 417, an OR calculator 420, a storage module 430, and selectors 441 to 448. In FIG. 6, logic functions that the logic function calculators 413 to 417 will perform are expressed by Maj, F, Ch, $\Sigma_0$, and $\Sigma_1$ respectively, and calculations that the rotation shift calculators 411 and 412 will perform are expressed by <<30 and <<5, respectively. At this time, "30" and "5" represent the number of bits to be rotated. Further, in FIG. 6, a, b, c, d, e, f, g, and h represent values stored in the registers 401 to 408, respectively.

Each of the registers 401 to 408 has an input terminal and an output terminal, and stores data inputted through the input terminal and outputs the stored data through the output terminal. Intermediate values in calculating the message digest in accordance with the SHA-1/SHA-256 hash calculation are stored in the registers 401 to 408.

The rotation shift calculators 411 and 412 have input terminals and output terminals and rotate data inputted through the input terminals to the left by 30 bits and 5 bits, respectively, and output the data through the output terminals. That is, the rotation shift calculators 411 and 412 perform calculations corresponding to $ROT_{LEFT30}$ and $ROT_{LEFT5}$ of Equation 1, respectively.

Each of the registers 413 to 415 has three input terminals and an output terminal and performs calculation of the corresponding logic function, and outputs the result value through the output terminal. That is, the logic function calculators 413, 414, and 415 perform calculations corresponding to "Maj" of Equation 6, "Ch" of Equation 6, and "f" of Equation 5, respectively, with respect to data inputted through the three input terminals. Further, each of the logic function calculators 416 and 417 has an input terminal and an output terminal, and performs calculation corresponding to $\Sigma_0$ corresponding to Equation 10/$\Sigma_1$ corresponding to Equation 11 with respect to data inputted through the input terminal and outputs the result value through the output terminal.

The OR calculator 420 has two input terminals and an output terminal, and adds and outputs data inputted through the two input terminals through the output terminal.

The storage module 430 stores $H_t$, which is an initial value used for the SHA-1 and SHA-256 hash calculations, and a round constant $K_t$. The round constant $K_t$ may vary for each round.

Each of the selectors 441 to 447 has two input terminals and an output terminal, and selects any one of data inputted through the two input terminals depending on the SHA-1/SHA-256 hash calculation determined in the controller 200 and outputs the data through the output terminal. Further, the selector 448 has seven input terminals and an output terminal, and selects any one of data inputted through the seven input terminals depending on the SHA-1/SHA-256 hash calculation determined in the controller 200 and outputs the data through the output terminal.

More specifically, first and second input terminals of the OR calculator 420 are connected to the output terminals of the selectors 447 and 448, respectively, and the output terminal of the OR calculator 420 is connected to the registers 401 and first input terminals of the selectors 442, 443, and 444.

The output terminal of the register 401 is connected to the input terminal of the register 402, a first input terminal of the logic function calculator 413, the input terminal of the rotation shift calculator 412, and the input terminal of the logic function calculator 416. The output terminal of the register 402 is connected to a first input terminal of the selector 441, the input terminal of the rotation shift calculator 411, a second input terminal of the logic function calculator 413, and a first input terminal of the logic function calculator 414. The output terminal of the rotation shift calculator 411 is connected to a second input terminal of the selector 444.

The output terminal of the register 441 is connected to the input terminal of the register 403, and the output terminal of the register 403 is connected to a second input terminal of the selector 442, the second input terminal of the logic function calculator 414, and a third input terminal of the logic function calculator 413.

The output terminal of the register selector 442 is connected to the input terminal of the register 404, and the output terminal of the register 404 is connected to a second input terminal of the selector 443, a third input terminal of the logic function calculator 414, and a third input terminal of the selector 448.

The output terminal of the selector 443 is connected to the input terminal of the register 405, and the output terminal of the register 405 is connected to the input terminal of the register 406, a first input terminal of the logic function calculator 415, a first input terminal of the selector 447, and the input terminal of the logic function calculator 417. The output terminal of the register 406 is connected to the input terminal of the register 407 and a second input terminal of the logic function calculator 415. The output terminal of the register 407 is connected to a second input terminal of the selector 444 and a third input terminal of the logic function calculator 415. The output terminals of the logic function calculators 415 and 417 are connected to first and second input terminals of the selector 448, respectively. The output terminals of the logic function calculators 413 and 414 are connected to first and second input terminals of the selector 445, respectively, and the output terminals of the rotation shift calculator 412 and the logic function calculator 416 are connected to first and second input terminals of the selector 446, respectively.

The output terminal of the selector 444 is connected to the input terminal of the register 408. The output terminal of the register 408 is connected to a second input terminal of the selector 447.

Further, the output terminals of the selectors 445 and 446 are connected to fifth and sixth input terminals of the selector 448, respectively. The storage module 430 is connected to a fourth input terminal of the selector 448. The intermediate data $W_t$ is connected to a seventh input terminal of the selector 448.

Step-by-step detailed operations for the SHA-1 hash calculation in the message compressor 400 are performed as shown in Table 3. Table 3 shows the step-by-step detailed operations for the SHA-1 hash calculation in the message compressor 400. In Table 3, "a" to "e" represent data stored in the registers 401 to 405, respectively.

TABLE 3

| Step | Clock cycle | Operation in round | Intermediate value |
|------|-------------|--------------------|--------------------|
| 1 | ① | $a = H_4$ | $a = H_4, b = a, c = b, d = c, e = d$ |
|   | ② | $a = H_3$ | $a = H_3, b = H_4, c = b, d = c, e = d$ |
|   | ③ | $a = H_2$ | $a = H_2, b = H_3, c = H_4, d = c, e = d$ |
|   | ④ | $a = H_1$ | $a = H_1, b = H_2, c = H_3, d = H_4, e = d$ |
|   | ⑤ | $a = H_0$ | $a = H_0, b = H_1, c = H_2, d = H_3, e = H_4$ |
| 2 | ① | $e = e + K_1$ | $e = e + K_1$ |
|   | ② | $e = e + ROT_{LEFT5}(a)$ | $e = e + K_1 + ROT_{LEFT5}(a)$ |
|   | ③ | $e = e + W_1$ | $e = e + W_1 + K_1 + ROT_{LEFT5}(a)$ |
|   | ④ | $a = e + f(b, c, d)$ | $a = f(b, c, d) + e + W_1 + K_1 + ROT_{LEFT5}(a)$ |
|   |   | $b = a$ | $b = a$ |
|   |   | $c = ROT_{LEFT30}(b)$ | $c = ROT_{LEFT30}(b)$ |
|   |   | $d = c$ | $d = c$ |
|   |   | $e = d$ | $e = d$ |
| 3 | ① | $a = e + H_4$ | $a = e + H_4, b = a, c = b, d = c, e = d$ |
|   | ② | $a = d + H_3$ | $a = d + H_3, b = e + H_4, c = b, d = c, e = d$ |
|   | ③ | $a = c + H_2$ | $a = c + H_2, b = d + H_3, c = e + H_4, d = c, e = d$ |
|   | ④ | $a = b + H_1$ | $a = b + H_1, b = c + H_2, c = d + H_3, d = e + H_4, e = d$ |
|   | ⑤ | $a = a + H_0$ | $a = a + H_0, b = b + H_1, c = c + H_2, d = d + H_3, e = e + H_4$ |

In accordance with the control signal from the controller 200, the registers 401 to 405, rotation shift calculator 412, logic function calculator 414, OR calculator 420, storage module 430, and selectors 441 to 448 of the message compressor 400 operate to calculate the message digest in accordance with the SHA-1 hash calculation.

First, prior to the clock cycle 1 of Step 2, $H_o$ to $H_4$, which are initial values defined in the SHA-1 hash calculation, must be established in the registers 401 to 405 (Step 1). The initial values $H_o$ to $H_4$ are established throughout five clock cycles. For this, the registers 401 to 405 operate as the shift registers, and the selectors 441 to 443 output data outputted from former registers 402 to 404 to latter registers 403 to 405, respectively.

More specifically, in the clock cycle 1 of Step 1, the storage module 430 outputs $H_4$. $H_4$ outputted from the storage module 430 is inputted into a first input terminal of the OR calculator 420 through the selector 448. "e" established in the register 405 is inputted into a second input terminal of the OR calculator 420 through the selector 447. At this time, since a, b, c, d, and e are 0, an output value of the OR calculator 420 is $H_4$, and $H_4$ is stored in the register 401 ($a=H_4$). In addition, values stored in the registers 401 to 404 are stored in the registers 402 to 405 by being shifted by one, respectively. Therefore, b, c, d, and e are $H_4$, 0, 0, and 9, respectively.

In the clock cycle 2 of Step 1, the storage module 430 outputs $H_3$. $H_3$ outputted from the storage module 430 is inputted into the first input terminal of the OR calculator 420 through the selector 448. In addition, "e" established in the register 405 is inputted into the second input terminal of the OR calculator 420 through the selector 447. At this time, since e is 0, the output value of the OR calculator 420 is $H_3$, and $H_3$ is stored in the register 401 ($a=H_3$). In addition, values stored in the registers 401 to 404 are stored in the registers 402 to 405 by being shifted by one, respectively. Therefore, b, c, d, and e are $H_3$, $H_4$, 0, and 0, respectively.

After the clock cycle 5 is performed in the same manner as above, a, b, c, d, and e are $H_o$, $H_1$, $H_2$, $H_3$, and $H_4$, respectively. By this configuration, when the initial values $H_o$ to $H_4$ are established in the registers 401 to 405, the message compressor 400 performs an operation of Step 2 shown in Table 3.

Referring to FIG. 3, in the clock cycle 1 of Step 2, the storage module 430 outputs the round constant $K_t$. $K_t$ outputted from the storage module 430 is inputted into the first input terminal of the OR calculator 420 through the selector 448. The OR calculator 420 adds and outputs the data $K_t$ inputted into the first input terminal and "e" of the register 405, which is inputted into the second input terminal through the selector 447. The data $K_t$+e outputted from the OR calculator 420 is stored in the register 405 through the selector 443 ($e=K_t$+e).

In the clock cycle 2 of Step 2, the rotation shift calculator 412 rotates "a" of the register 401 to the left by 5 bits and outputs the rotated "a". Data "$ROT_{LEFT5}(a)$" outputted from the rotation shift calculator 412 is inputted into the first input terminal of the OR calculator 420 through the selectors 446 and 448. The OR calculator 420 adds and outputs the data "$ROT_{LEFT5}(a)$" inputted into the first input terminal, and "e ($=K_t$+e)" of the register 405 inputted into the second input terminal through the selector 447. The data "$ROT_{LEFT5}(a)+K_t$+e" outputted from the OR calculator 420 is stored in the register 405 through the selector 443 ($ROT_{LEFT5}(a)+K_t$+e).

In the clock cycle 3 of Step 2, the selector 448 outputs the intermediate data $W_t$ inputted into the seventh input terminal. Therefore, the OR calculator 420 adds and outputs the intermediate data Wt and e ($=ROT_{LEFT5}(a)+K_t$+e$ROT_{LEFT5}(a)$) of the register inputted through the selector 447. The data "Wt+$ROT_{LEFT5}(a)+K_t$+e" outputted from the OR calculator 420 is stored in the register 405 through the selector 443 ($e=W_t+ROT_{LEFT5}(a)+K_t$+e).

In the last clock cycle 4 of Step 2, the logic function calculator 414 calculates and outputs b, c, and d of the registers 402 to 404. The data "f(b, c, d)" outputted from the logic function calculator 414 is inputted into the first input terminal of the OR calculator 420 through the selectors 445 and 448. The OR calculator 420 adds and outputs the data "f(b, c, d)" inputted into the first input terminal and e ($=W_t+ROT_{LEFT5}(a)+K_t$+e) of the register 405, which is inputted into the second input terminal through the selector 447. The data "f(b, c, d)+$W_t+ROT_{LEFT5}(a)+K_t$+e" outputted from the OR calculator 420 is stored in the register 401 ($a=f(b, c, d)+W_t+ROT_{LEFT5}(a)+K_t$+e). In addition, a, b, c, d, and e stored in the registers 401 to 404 are shifted by one and stored.

As such, when the SHA-1 hash calculation for one round is terminated throughout four clock cycles 1 to 4, the above-mentioned four clock cycles 1 to 4 are repeated until the $80^{th}$ round. Thereafter, the intermediate vales of the SHA-1 hash calculation are stored in the registers 401 to 405. At this time, in order to calculate the message digest of the SHA-1 hash calculation, the values a to e stored in the registers 401 to 405 throughout 80 rounds and the initial values $H_0$ to $H_4$ stored in the storage module 430 are added to each other. Therefore, in the same manner as in Step 1, in Step 3 the values stored in the registers 401 to 405 and the initial values $H_o$ to $H_4$ stored in the storage module 430 are added to each other throughout five clock cycles.

In this case, values of a (=a+$H_0$), b (=b+$H_1$), c (=c+$H_2$), d (=d+$H_3$), and e (=e+$H_4$) are stored in the registers 401 to 405, respectively. In addition, when an interrupt signal or a polling signal indicating that the calculation is terminated in the controller 200 is generated, the initial values $H_o$ to $H_4$ stored in the storage module 430 are updated to the values a (=a+$H_0$), b (=b+$H_1$), c (=c+$H_2$), d (=d+$H_3$), and e (=e+$H_4$) that are stored in the registers 401 to 405.

When the SHA-1 hash calculation is performed only at one time, the message compressor 400 outputs the updated initial values $H_0$ (=a), $H_1$ (=b), $H_2$ (=c), $H_3$ (=d), and $H_4$ (=e) to a system 10 through the system bus 21 as output values of the SHA-1 hash calculation, and when the SHA-1 hash calculation is performed several times, the message compressor 400 repeatedly performs the above steps throughout 80 rounds by using the updated initial values as initial values of the SHA-1 hash calculation with respect to calculation data of 512 bits. As such, when the SHA-1 hash calculation is performed several times, the initial values $H_0$ (=a), $H_1$ (=b), $H_2$ (=c), $H_3$ (=d), and $H_4$ (=e) are stored in the registers 401 to 405 at the time of performing the SHA-1 hash calculation with respect to second calculation data of 512 bits, such that Step 2 can be performed without Step 1.

Further, step-by-step detailed operations for the SHA-256 hash calculation in the message compressor 400 are performed as shown in Table 4. Table 4 shows the step-by-step detailed operations for the SHA-256 hash calculation in the message compressor 400.

In accordance with the control signal from the controller 200, the registers 401 to 408, logic function calculators 413 and 415 to 417, OR calculator 420, storage module 430, and selectors 441 to 448 of the message compressor 400 operate to calculate the message digest in accordance with the SHA-256 hash calculation.

Similar to the above-mentioned SHA-1 hash calculation, even in the SHA-256 hash calculation, prior to the clock cycle 1 of Step 2, $H_0$ to $H_7$ that are initial values defined in the SHA-256 hash calculation must be established in the registers 401 to 408 (Step 1). The initial values $H_0$ to $H_7$ are established throughout eight clock cycles. For this, the registers 401 to 408 operate as the shift registers and the selectors 441 to 444 output data outputted from former registers 402 to 404 and 407 to latter registers 403 to 405 and 408, respectively.

More specifically, in the clock cycle 1 of Step 1, the storage module 430 outputs $H_7$. $H_7$ outputted from the storage module 430 is inputted into the first input terminal of the OR calculator 420 through the selector 448. In addition, "h" established in the register 408 is inputted into the second input terminal of the OR calculator 420 through the selector 447. At this time, since a, b, c, d, e, f, g, and e are 0, the output value of the OR calculator 420 is $H_7$ and $H_7$ is stored in the register 401 (a=$H_7$). In addition, values stored in the registers 401 to 407 are stored in the registers 402 to 408 by being shifted by one, respectively. Therefore, b, c, d, e, f, g, and h are $H_7$, 0, 0, 0, 0, 0, and 0, respectively.

In the clock cycle 2 of Step 1, the storage module 430 outputs $H_6$. $H_6$ outputted from the storage module 430 is inputted into the first input terminal of the OR calculator 420 through the selector 448. In addition, "h" established in the register 408 is inputted into the second input terminal of the

TABLE 4

| Step | Clock cycle | Operation in round | Intermediate value |
|---|---|---|---|
| 1 | (1) | $a = H_7$ | $a = H_7, b = a, c = b, d = c, e = d, f = e, g = f, h = g$ |
| | (2) | $a = H_6$ | $a = H_6, b = H_6, c = b, d = c, e = d, f = e, g = f, h = g$ |
| | (3) | $a = H_5$ | $a = H_5, b = H_6, c = H_7, d = c, e = d, f = e, g = f, h = g$ |
| | (4) | $a = H_4$ | $a = H_4, b = H_5, c = H_6, d = H_7, e = d, f = e, g = f, h = g$ |
| | (5) | $a = H_3$ | $a = H_3, b = H_4, c = H_5, d = H_6, e = H_7, f = e, g = f, h = g$ |
| | (6) | $a = H_2$ | $a = H_2, b = H_3, c = H_4, d = H_5, e = H_6, f = H_7, g = f, h = g$ |
| | (7) | $a = H_1$ | $a = H_1, b = H_2, c = H_3, d = H_4, e = H_5, f = H_6, g = H_7, h = g$ |
| | (8) | $a = H_0$ | $a = H_0, b = H_1, c = H_2, d = H_3, e = H_4, f = H_5, g = H_6,$ $h = H_7$ |
| 2 | (1) | $h = h + Ch(e, f, g)$ | $h = h + Ch(e, f, g)$ |
| | (2) | $h = h + K_j$ | $h = h + Ch(e, f, g) + K_j$ |
| | (3) | $h = h + \Sigma_1(e)$ | $h = \Sigma_1(e) + Ch(e, f, g) + h + K_j$ |
| | (4) | $h = h + W_j$ | $h = \Sigma_1(e) + Ch(e, f, g) + h + K_j + W_j$ |
| | (5) | $d = d + h$ | $h = \Sigma_1(e) + Ch(e, f, g) + K_j + W_j$ |
| | | | $d = d + \Sigma_1(e) + Ch(e, f, g) + h + K_j + W_j$ |
| | (6) | $h = h + Maj(a, b, c)$ | $h = Maj(a, b, c) + \Sigma_1(e) + Ch(e, f, g) + h + K_j + W_j$ |
| | (7) | $a = h + \Sigma_0(a)$ $b = a, c = b, d = c,$ $e = d, f = e,$ $g = f, h = g$ | $a = \Sigma_0(a) + Maj(a, b, c) + \Sigma_1(e) + Ch(e, f, g) + h + K_j + W_j$ $b = a, c = b, d = c$ $e = d + \Sigma_1(e) + Ch(e, f, g) + h + K_j + W_j$ $f = e, g = f, h = g$ |
| 3 | (1) | $a = h + H_7$ | $a = h + H_7, b = a, c = b, d = c, e = d, f = e, g = f, h = g$ |
| | (2) | $a = g + H_6$ | $a = g + H_6, b = h + H_7, c = b, d = c, e = d$ $f = e, g = f, h = g$ |
| | (3) | $a = f + H_5$ | $a = f + H_5, b = g + H_6, c = h + H_7, d = c, e = d$ $f = e, g = f, h = g$ |
| | (4) | $a = e + H_4$ | $a = e + H_4, b = f + H_5, c = g + H_6, d = h + H_7$ $e = d, f = e, g = f, h = g$ |
| | (5) | $a = d + H_3$ | $a = d + H_3, b = e + H_4, c = f + H_5, d = g + H_6$ $e = h + H_7, f = e, g = f, h = g$ |
| | (6) | $a = c + H_2$ | $a = c + H_2, b = d + H_3, c = e + H_4, d = f + H_5$ $e = g + H_6, f = h + H_7, g = f, h = g$ |
| | (7) | $a = b + H_1$ | $a = b + H_1, b = c + H_2, c = d + H_3, d = e + H_4$ $e = f + H_5, f = g + H_6, g = h + H_7, h = g$ |

OR calculator 420 through the selector 447. At this time, since h is 0, the output value of the OR calculator 420 is $H_6$, and $H_6$ is stored in the register 401. In addition, values stored in the registers 401 to 407 are stored in the registers 402 to 408 by being shifted by one, respectively. Therefore, b, c, d, e, f, g, and h are $H_6$, $H_7$, 0, 0, 0, 0, and 0, respectively.

In the same manner as above, in the clock cycles 3 to 8 of Step 1, the storage module 430 outputs $H_5$ to $H_o$, and after the clock cycle 8 is performed, a, b, c, d, e, f, g, and h become $H_o$, $H_1$, $H_2$, $H_3$, $H_4$, $H_5$, $H_6$, and $H_7$, respectively.

By this configuration, when the initial values $H_0$ to $H_7$, are established in the registers 401 to 408, the message compressor 400 performs an operation of Step 2 shown in Table 4.

Referring to Table 4, in the clock cycle 1 of Step 2, the logic function calculator 415 performs logic function calculation corresponding to Equation 7 with respect to data e, f, and g stored in the registers 405 to 407 and outputs the calculated data. Data "Ch(e,f,g)" outputted from the logic function calculator 415 is inputted into the first input terminal of the OR calculator 420 through the selector 448, and h stored in the register 408 is inputted into the second input terminal of the OR calculator 420 through the selector 447. The OR calculator 420 adds and outputs the data "Ch(e,f,g) and h" that are inputted into the first and second input terminals. The data "Ch(e,f,g)+h" outputted from the OR calculator 420 is stored in the register 408 through the selector 444 (h=Ch(e,f,g)+h).

In the clock cycle 2, the storage module 430 outputs the round constant $K_t$. $K_t$ outputted from the storage module 430 is inputted into the first input terminal of the OR calculator 420 through the selector 448, and h (=Ch(e,f,g)+h) stored in the register 408 is inputted into the second input terminal of the OR calculator 420 through the selector 447. The OR calculator 420 adds and outputs the data "$K_t$ and Ch(e,f,g)+h" that are inputted into the first and second input terminals. The data "$K_t$+Ch(e,f,g)+h" outputted from the OR calculator 420 is stored in the register 408 through the selector 444 (h=$K_t$+Ch(e,f,g)+h).

In the clock cycle 3, the logic function calculator 417 performs logic function calculation corresponding to Equation 11 with respect to "e" stored in the register 405, and outputs the calculated "e". Data "$\Sigma_1(e)$" outputted from the logic function calculator 417 is inputted into the first input terminal of the OR calculator 420 through the selector 448, and h (=$K_t$+Ch(e,f,g,)+h) stored in the register 408 is inputted into the second input terminal of the OR calculator 420 through the selector 447. The OR calculator 420 adds and outputs the data "$\Sigma_1(e)$ and $K_t$+Ch(e,f,g,)+h" that are inputted into the first and second input terminals. The data "$\Sigma_1(e)$+Kt+Ch(e,f,g,)+h" outputted from the OR calculator 420 is stored in the register 408 through the selector 444 (h=$\Sigma_1(e)$+$K_t$+Ch(e,f,g,)+h). In the clock cycle 4, the selector 448 outputs the intermediate data $W_t$. The data $W_t$ outputted from the selector is inputted into the first input terminal of the OR calculator 420 through the selector 448, and h (=$\Sigma_1(e)$+$K_t$+Ch(e,f,g,)+h) stored in the register 408 is inputted into the second input terminal of the OR calculator 420 through the selector 447. The OR calculator 420 adds and outputs the data "$W_t$ and $\Sigma_1(e)$+$K_t$+Ch(e,f,g,)+h" that are inputted into the first and second input terminals.

The data "$W_t$+$\Sigma_1(e)$+$K_t$+Ch(e,f,g,)+h" outputted from the OR calculator 420 is stored in the register 408 through the selector 444 (h=$W_t$+$\Sigma_1(e)$+$K_t$+Ch(e,f,g,)+h). The message compressor 400 according to the embodiment of the present invention outputs the intermediate data $W_t$ to the OR calculator 420 after the fourth clock cycle 4 by considering a time required to generate the intermediate data $W_t$ in the message scheduler 300. That is, four clock cycles are required to generate the intermediate data $W_t$ in the message scheduler 300. Referring to FIG. 4, seven clock cycles are required to perform the SHA-256 hash calculation in the message compressor 400, which is sufficient time to calculate the intermediate data $W_t$ in the message scheduler 300. Therefore, when the intermediate data $W_t$ is outputted to the OR calculator 420 after the fourth clock cycle 4, additional time for generating the intermediate data $W_t$ in the message scheduler 300 is not required.

In the clock cycle 5, "d" stored in the register 404 is inputted into the first input terminal of the OR calculator 420 through the selector 448, and h (=$W_t$+$\Sigma_1(e)$+$K_t$+Ch(e,f,g,)+h) stored in the register 408 is inputted into the second input terminal of the OR calculator 420 through the selector 447. The OR calculator 420 adds and outputs the data "$H_3$ and $W_t$+(e)+$K_t$+Ch(e,f,g,)+h" that are inputted into the first and second input terminals. The data "d+$W_t$+$\Sigma_1(e)$+$K_t$+Ch(e,f,g,)+h" outputted from the OR calculator 420 is stored in the register 404 through the selector 442 (d=d+$W_t$+$\Sigma_1(e)$+$K_t$+Ch(e,f,g,)+h). By this configuration, when the fifth clock cycle is terminated, a value for "e=d+$T_1$" in Equation 6 is stored in the register 404.

In the clock cycle 6, the logic function calculator 413 performs logic function calculation corresponding to Equation 9 with respect to data "a", "b", and "c" stored in the registers 401 to 403, and outputs the calculated "a", "b", and "c". Data "Maj(a,b,c)" outputted from the logic function calculator 413 is inputted into the first input terminal of the OR calculator 420 through the selectors 445 and 448, and e (=$W_t$+$\Sigma_1(e)$+$K_t$+Ch(e,f,g,)+h) stored in the register 408 is inputted into the second input terminal of the OR calculator 420 through the selector 447. The OR calculator 420 adds and outputs the data "Maj(a,b,c) and $W_t$+$\Sigma_1(e)$+$K_t$+Ch(e,f,g,)+h" that are inputted into the first and second input terminals. The data "Maj(a,b,c)+$W_t$+$\Sigma_1(e)$+$K_t$+Ch(e,f,g,)+h" outputted from the OR calculator 420 is stored in the register 408 through the selector 442 (h=Maj(a,b,c)+$W_t$+$\Sigma_1(e)$+$K_t$+Ch(e,f,g,)+h).

Lastly, in the clock cycle 7, the logic function calculator 416 performs the logic function calculation corresponding to Equation 9 with respect to "a" stored in the register 401, and outputs the calculated "a". Data "$\Sigma_0(a)$" outputted from the logic function calculator 416 is inputted into the first input terminal of the OR calculator 420 through the selectors 446 and 448, and h (=Maj(a,b,c)+$W_t$+$\Sigma_1(e)$+$K_t$+Ch(e,f,g,)+h) stored in the register 408 is inputted into the second input terminal of the OR calculator 420 through the selector 447. The OR calculator 420 adds and outputs the data "$\Sigma_0(a)$ and Maj(a,b,c)+$W_t$+$\Sigma_1(e)$+$K_t$+Ch(e,f,g,)+$H_7$" that are inputted into the first and second input terminals. The data "$\Sigma_0(a)$+Maj(a,b,c)+$W_t$+$\Sigma_0(e)$+$K_t$+Ch(e,f,g,)+h" outputted from the OR calculator 420 is stored in the register 401 (h=Maj(a,b,c)+$W_t$+$\Sigma_1(e)$+$K_t$+Ch(e,f,g,)+h). In addition, the data stored in the registers 401 to 407 are stored in the registers 402 to 408 by being shifted by one, respectively. That is, in the clock cycle 5, since "$H_3$+$W_t$+$\Sigma_1(e)$+$K_t$+Ch(e,f,g,)+h" is stored in the register 404, the data "$H_3$+$W_t$+$\Sigma_1(e)$+$K_t$+Ch(e,f,g,)+h" is stored in the register 405.

As such, when the SHA-256 hash calculation for one round is terminated throughout seven clock cycles 1 to 7, the above-mentioned seven clock cycles 1 to 7 are repeated until the $64^{th}$ round. Thereafter, the intermediate vales of the SHA-256 hash calculation are stored in the registers 401 to 408. At this time, in order to calculate the message digest of the SHA-256 hash calculation, the values a to h stored in the registers 401 to 408 throughout 64 rounds and the initial values $H_0$ to $H_7$ stored in the storage module 430 are added to each other. Therefore, in the same manner as in Step 1, in Step 3 the values stored in the registers 401 to 408 and the initial values $H_o$ to $H_7$ stored in the storage module 430 are added to each other throughout eight clock cycles.

In this case, values of a $(=a+H_0)$, b $(=b+H_1)$, c $(=c+H_2)$, d $(=d+H_3)$, e $(=e+H_4)$, f $(=f+H_5)$, g $(=g+H_6)$, and h $(=h+H_7)$ are stored in the registers 401 to 408, respectively. In addition, when the interrupt signal or the polling signal indicating that the calculation is terminated in the controller 200 is generated, the initial values $H_0$ to $H_7$ stored in the storage module 430 are updated to the values a $(=a+H_0)$, b $(=b+H_i)$, c $(=c+H_2)$, d $(=d+H_o)$, e $(=e+H_4)$, f $(=f+H_5)$, g $(=g+H_6)$, and h $(=h+H_7)$ that are stored in the registers 401 to 408.

When the SHA-256 hash calculation is performed only one time, the message compressor 400 outputs the updated initial values a $(=a+H_0)$, b $(=b+H_i)$, c $(=c+H_2)$, d $(=d+H_3)$, e $(=e+H_4)$, f $(=f+H_5)$, g $(=g+H_6)$, and h $(=h+H_7)$ to the system 10 through the system bus 21 as the output values of the SHA-256 hash calculation, and when the SHA-256 hash calculation is performed several times, the message compressor 400 repeatedly performs the above steps throughout 64 rounds by using the updated initial values as the initial values of the SHA-256 hash calculation with respect to the calculation data of 512 bits. When the SHA-256 hash calculation is performed several times, the initial values a $(=a+H_0)$, b $(=b+H_1)$, c $(=c+H_2)$, d $(=d+H_o)$, e $(=e+H_4)$, f $(=f+H_5)$, g $(=g+H_6)$, and h $(=h+H_7)$ are stored in the registers 401 to 408 at the time of performing the SHA-1 hash calculation with respect to second calculation data of 512 bits, such that Step 2 can just be performed without Step 1.

Figure 7:
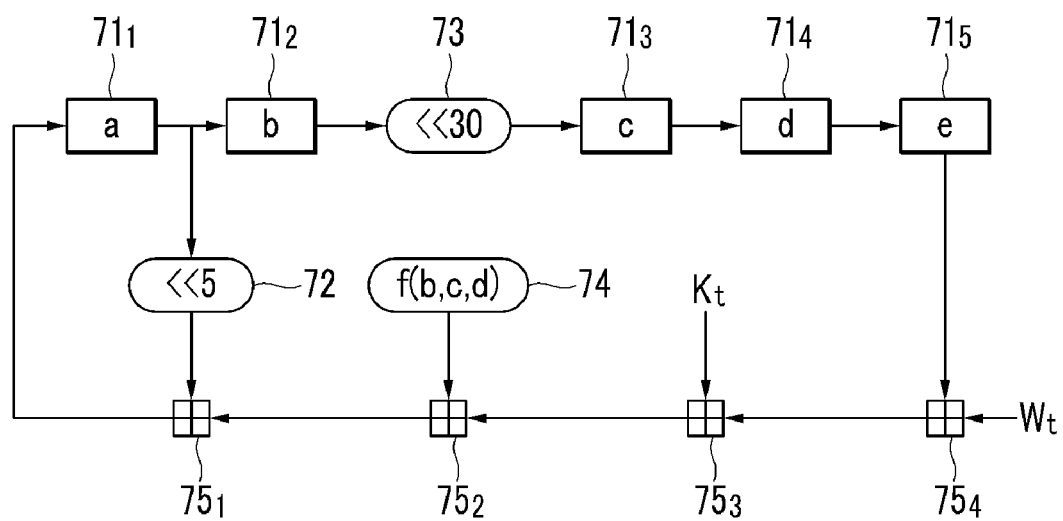
FIGS. 7 and 8 are diagrams illustrating a hardware structure for calculating a message digest in an SHA-1 and an SHA-256, respectively.
Figure 8:
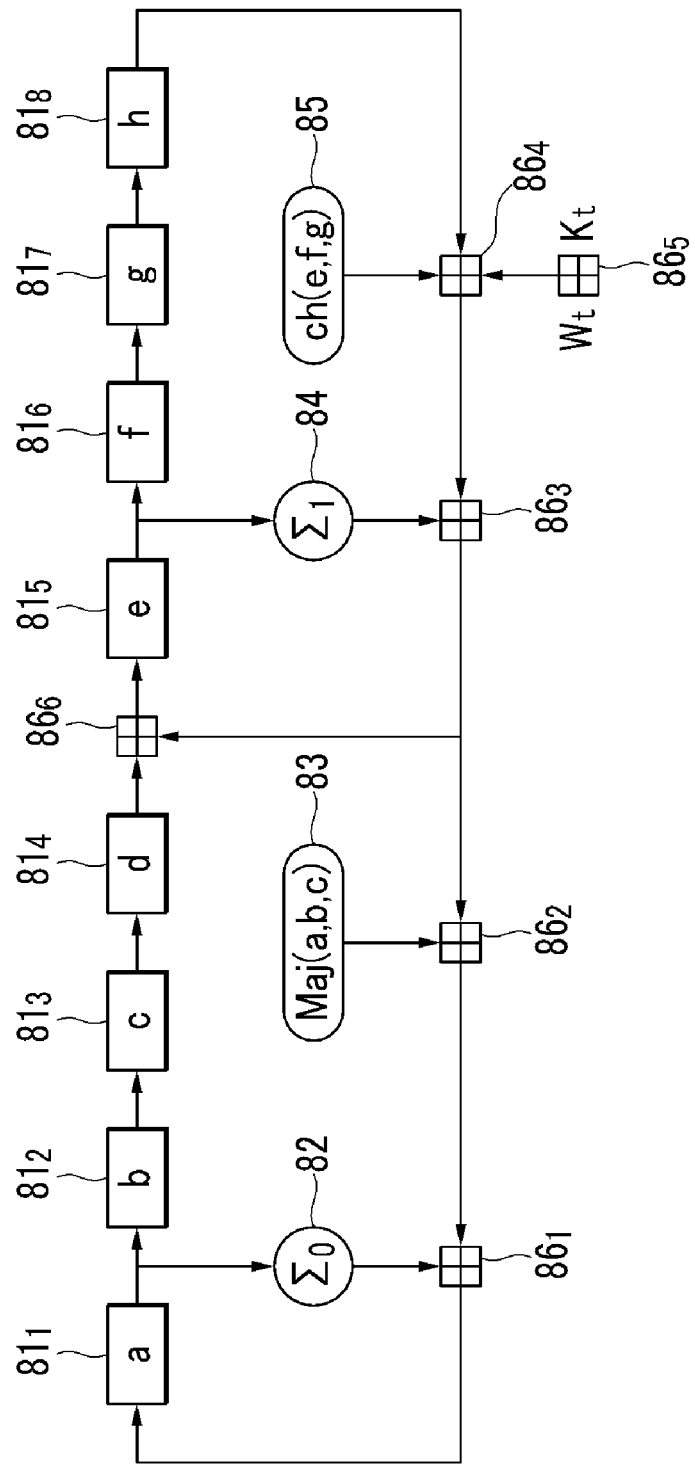

In general, as shown in FIG. 7, registers 71₁ to 71₅ storing a, b, c, d, and e, respectively, rotation shift calculators 72 and 73 for calculating $ROT_{LEFT5}$ and $ROT_{LEFT30}$, a logic calculator 74 for calculating $f_t$, and four OR calculators 75₁ to 75₄ for calculating "$f_t(b_{t-1},c_{t-1},d_{t-1})+e_{t-1}+ROT_{LEFT5}(a_{t-1})+W_t+K_t$" are required for calculation shown in Equation 5. Further, as shown in FIG. 8, registers 81₁ to 81₈ storing a, b, c, d, e, f, g, and h, respectively, logic calculators 82 to 85 for calculating $\Sigma_0$, Maj, $\Sigma_1$, and Ch, and six OR calculators 86₁ to 86₆ for calculating "$T_1=h+\Sigma_1(e)+Ch(e,f,g)+K_t+W_t$" and "$T_2=\Sigma_0(a)+Maj(a,b,c)$" are required for calculation shown in Equation 6. However, as shown in FIGS. 7 and 8, since use of too many hardware resources increases a hardware area and power consumption, it is difficult to adopt the message scheduler in a mobile phone requiring small-area characteristics or a low-power embedded system.

However, according to an exemplary embodiment of the present invention, a message compressor 400 finally calculates one message digest by using eight registers 401 to 408 operating as the shift register and one OR calculator 420, thereby minimizing the hardware area and power consumption.

The exemplary embodiments of the present invention are implemented through not only the apparatus and method, but may be implemented through a program that realizes functions corresponding to constituent members of the exemplary embodiments of the present invention or a recording medium in which the program is recorded. The implementation will be easily implemented by those skilled in the art as described in the exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for hash cryptography, comprising:
   a message scheduler generating a plurality of first message data using a calculation data when a first hash calculation is performed and generating a plurality of second message data using the calculation data when a second hash calculation is performed, wherein the message scheduler includes:
      a memory receiving and storing N first message data when the first hash calculation is performed and receiving and storing N second message data when the second hash calculation is performed;
      a register storing and outputting the data inputted when the first hash calculation is performed and storing and outputting the data inputted when the second hash calculation is performed;
      a first logic calculator generating additional first message data by performing first logic calculation on the basis of the first message data and the data stored in the register; and
      a second logic calculator generating additional second message data by performing second logic calculation on the basis of the second message data and the data stored in the register, wherein the controller stores the first message data additionally generated by the first logic calculator in the memory and repeats the first logic calculation until M additional first message data are generated when the first hash calculation is performed, wherein the controller stores the second message data additionally generated by the second logic calculator in the memory and repeats the second logic calculation until L additional second message data are generated when the second hash calculation is performed, and wherein N, M, N, and L are positive integers;
   a message compressor calculating a first message digest by performing the first hash calculation by using the plurality of second message data when a first hash calculation is performed, and calculating a second message digest by performing the second hash calculation by using the plurality of second message data when the second hash calculation is performed; and
   a controller determining hash calculation to be performed with respect to the calculation data of the first and second hash calculations from a control command received from the outside, and determining the number of times to perform the hash calculation depending on the length of the calculation data to control the message scheduler and the message compressor depending on the determined hash calculation and the determined number of times.

2. The apparatus of claim 1, wherein the first hash calculation is a secure hash algorithm (SHA)-1 and the second hash calculation is an SHA-256.

3. The apparatus of claim 1, wherein the first logic calculator includes:
   an XOR calculator updating the data of the register by XOR-calculating any one of the first message data stored in the memory and the data stored in the register; and
   a rotation shift calculator rotation-shifting the data stored in the register and outputting the rotation-shifted data after the XOR calculation is repeatedly performed by the XOR calculator the predetermined number of times, and is outputted data according to the rotation-shifting as the additional first message data, wherein any one of the first message data stored in the memory is stored in the register before the XOR calculation.

4. The apparatus of claim 1, wherein the second logic calculator includes:
a third logic calculator performing corresponding third logic calculation among a plurality of third logic calculations with respect to any one of the second message data stored in the memory and outputting the calculated data; and
an OR calculator updating the data of the register by OR-calculating the data outputted from the third logic calculator and the data stored in the register,
wherein the data by the OR calculation is outputted data according to the OR calculation after the third logic calculation and the OR calculation are repeatedly performed with respect to the second message data of a predetermined number as the additional second message data, and
any one of the second message data stored in the memory is stored in the register before the first third logic calculation.

5. The apparatus of claim 4, wherein
the plurality of third logic calculations includes:
logic calculation in which rotation and shift are performed in a first pattern with respect to input data;
logic calculation in which the rotation and shift are performed in a second pattern different from the first pattern with respect to the input data; and
logic calculation in which the input data is outputted as it is.

6. The apparatus of claim 1, wherein
the message compressor includes:
a plurality of registers that store and output the input data and are connected to each other in a structure in which data outputted from a former register is inputted into a latter register;
a storage module that stores a plurality of first round constants used for the first hash calculation and a plurality of second round constants used for the second hash calculation and outputs first and second round constants of a corresponding round among the plurality of first and second round constants;
a plurality of first calculators that perform logic calculation required for the first hash calculation by using at least one of the data stored in the plurality of registers;
a plurality of second calculators that perform logic calculation required for the second hash calculation by using at least one of the data stored in the plurality of registers; and
an OR calculator that updates the data of the first register by OR-calculating one first data selected among the first round constant outputted from the storage module, the data outputted from the plurality of first calculators, and the first message data outputted from the message scheduler, and data stored in a first register of the plurality of registers when the first hash calculation is performed, and updates the data of the second register by OR-calculating the second round constant outputted from the storage module, the data outputted from the plurality of second calculators, and one second data selected among the second message data outputted from the message scheduler and data stored in a second register among the plurality of registers when the second hash calculation is performed, wherein the controller performs first round calculation of storing the data outputted from the OR calculator in a third register that is positioned at a first location of the plurality of registers after repeatedly performing the OR calculation a first number of times while changing selection of the first data and allowing the plurality of registers to operate as shift registers when the first hash calculation is performed, and
the controller performs second round calculation of storing the data outputted from the OR calculator in the third register by repeatedly performing the OR calculation a second number of times while changing selection of the second data and allowing the plurality of registers to operate as the shift registers when the second hash calculation is performed.

7. The apparatus of claim 6, wherein
the controller repeatedly performs the first round calculation a predetermined number of times of rounds while selecting the first round constant of the corresponding round and the first message data when the first hash calculation is performed, and
the controller repeatedly performs the second round calculation a predetermined number of times of rounds while selecting the second round constant of the corresponding round and the second message data when the second hash calculation is performed.

8. The apparatus of claim 7, wherein:
a plurality of first initial values and a plurality of second initial values are stored in the storage module;
the message compressor updates the plurality of first initial values by using a plurality of data stored in the third to first registers among the plurality of registers after the first round calculation is repeatedly performed the predetermined number of times of rounds when the first hash calculation is performed;
the message compressor updates the plurality of second initial values by using a plurality of data stored in the third to second registers among the plurality of registers after the second round calculation is repeatedly performed the predetermined number of times of rounds when the second hash calculation is performed; and
the updated first and second initial values are used as message digests of the first and second hash calculations, respectively.

9. The apparatus of claim 8, wherein
the controller includes:
a first counter storing round information of a corresponding round; and
a second counter storing clock cycle information corresponding to the number of times in which the OR calculation is repeatedly performed in the corresponding round,
wherein the controller generates a control signal indicating that the hash calculation is terminated on the basis of the round information and the clock cycle information and outputs the generated control signal to the message compressor.

10. A message scheduler generating a plurality of first and second message data required for first and second hash calculations, respectively, in an apparatus for hash cryptography, comprising:
a memory that divides and stores block data to be calculated into N sub-block data;
a register that stores and outputs input data;
an XOR calculator that operates when the first hash calculation is performed and updates the data of the register by XOR-calculating the sub-block data stored in the memory and the data stored in the register, a rotation shift calculator that rotation-shifts and outputs the data stored in the register after the XOR calculation is repeatedly performed a predetermined number of times by the XOR calculator;

a logic calculator that operates when the second hash calculation is performed and performs corresponding logic calculation among a plurality of logic calculations with respect to any one of the sub-block data stored in the memory; and an OR calculator that updates the data of the register by OR-calculating the data outputted from the logic calculator and the data stored in the register, wherein the N sub-block data and the output data of the rotation shift calculator are respectively used as the plurality of first message data when the first hash calculation is performed, the data by the OR calculation after the corresponding logic calculation and the OR calculation are repeatedly performed with respect to the N sub-block data and the second message data of a predetermined number are used as the plurality of second message data when the second hash calculation is performed, and N is a positive integer.

11. The message scheduler of claim 10, wherein the output data of the rotation shift calculator is stored in the memory when the first hash calculation is performed, and the data by the OR calculation is stored in the memory after the corresponding logic calculation and the OR calculation are repeatedly performed when the second hash calculation is performed.

12. A message compressor calculating a message digest by performing hash calculation with respect to block data to be calculated in an apparatus for hash cryptography, comprising:

a plurality of registers that store and output input data and are connected to each other in a structure in which data outputted from a former register is inputted into a latter register; and an OR calculator that OR-calculates first data selected among a plurality of inputted first data and data stored in a first register among the plurality of registers to update the data of the first register when a first hash calculation is performed, and OR-calculates second data selected among a plurality of inputted second data and data stored in a second register among the plurality of registers to update the data of the second register when a second hash calculation is performed, wherein a first round calculation is performed, which stores the data outputted from the OR calculator in a third register that is positioned at a first location of the plurality of registers after repeatedly performing the OR calculation a first number of times while changing selection of the first data and operates the plurality of registers as shift registers when the first hash calculation is performed, and a message digest according to the first hash calculation is calculated by repeatedly performing the first round calculation a predetermined number of times of rounds, and a second round calculation is performed, which stores the data outputted from the OR calculator in the third register after repeatedly performing the OR calculation a second number of times while changing selection of the second data and operates the plurality of registers as the shift registers when the second hash calculation is performed, and a message digest by the second hash calculation is calculated by repeatedly performing the second round calculation a predetermined number of times of rounds.

13. The message compressor of claim 12, further comprising a storage module that stores a plurality of first round constants corresponding to the first hash calculation and a plurality of second round constants corresponding to the second hash calculation and outputs corresponding first and second round constants among the plurality of first and second round constants, wherein the first round calculation is repeatedly performed while selecting the first round constant of the corresponding round and first message data of the corresponding round, which is outputted from the message scheduler when the first hash calculation is performed, and the second round calculation is repeatedly performed while selecting the second round constant of the corresponding round and second message data of the corresponding round, which is outputted from a message scheduler when the second hash calculation is performed.

14. The message compressor of claim 13, wherein the storage module stores a plurality of first and second initial values in accordance with a control signal indicating that hash calculation is terminated from a controller, the plurality of first initial values are updated by using a plurality of data stored in the third to first registers among the plurality of registers when the first hash calculation is performed and the plurality of second initial values are updated by using a plurality of data stored in the third to second registers among the plurality of registers when the second hash calculation is performed, and message digests according to the first and second hash calculations are calculated from the plurality of updated first and second initial values.

15. The message compressor of claim 13, further comprising:

a plurality of first logic calculators that perform logic calculation required for the first hash calculation by using at least one of the data stored in the plurality of registers;

a plurality of second logic calculators that perform logic calculation required for the second hash calculation by using at least one of the data stored in the plurality of registers; and a selector that selects and outputs output data of any one logic calculator among the output data of the plurality of first and second logic calculators and any one round constant of the first and second round constants corresponding to the first and second hash calculations and one message data of the first and second message data corresponding to the first and second hash calculations to the OR calculator depending on the hash calculation to be performed with respect to the block data.

16. A method for hash cryptography, comprising:

dividing calculation data received from the outside into N block data and storing the block data in a memory;

storing the N block data in a register;

generating the N block data stored in the register as first message data to be used in first to N-th rounds when a first hash calculation is performed;

generating the first message data of a corresponding round by performing XOR calculation a predetermined number of times by using one XOR calculator on the basis of the first message data and the data stored in the register in each of (N+1)-th to M-th rounds when the first hash calculation is performed;

generating the N block data stored in the register as second message data to be used in the first to N-th rounds when a second hash calculation is performed; generating the second message data of a corresponding round by performing XOR calculation a predetermined number of times by using one OR calculator on the basis of the second message data and the data stored in the register in each of (N+1)-th to K-th rounds when the second hash calculation is performed;

calculating a first message digest by using M first message data corresponding to first to M-th rounds when the first hash calculation is performed; and calculating a second message digest by using second message data corresponding to first to K-th rounds when the second hash calculation is performed, wherein the N, M, and K are positive integers;

wherein calculating the first message digest includes:
  updating the data of the first register by OR-calculating one first data selected among a plurality of inputted first data and data stored in a second register positioned at the last location among a plurality of first registers that operate when the first hash calculation is performed by using another OR calculator;
  shifting the data of the plurality of first registers after performing the OR calculation a predetermined number of times and storing the first data in a third register positioned at a first location among the plurality of first registers while changing selection of the first data; and
  calculating the first message digest by using the data stored in the plurality of first registers and a plurality of first initial values by repeatedly performing the updating step and the shifting step while selecting a round constant of a corresponding round in first to M-th rounds and the first message data, and calculating the second message digest includes:
  updating the data of the fifth register by OR-calculating one second data selected among a plurality of inputted second data and data stored in a fifth register positioned at the last location among a plurality of fourth registers that operate when the second hash calculation is performed by using another OR calculator;
  shifting the data of the plurality of fourth registers after repeatedly performing the OR calculation a predetermined number of times and storing the second data in a sixth register positioned at the first location among the plurality of fourth registers while changing selection of the second data; and
  calculating the second message digest by using the data stored in the plurality of fourth registers and a plurality of second initial values by repeatedly performing the updating step and the shifting step while selecting a round constant of a corresponding round in first to K-th rounds and the second message data.

17. The method of claim 16, wherein the first hash calculation is a secure hash algorithm (SHA)-1 and the second hash calculation is an SHA-256.

18. The method of claim 16, wherein the plurality of first registers are parts of the plurality of fourth registers, and the third register and the sixth register are the same register.

* * * * *